(12) United States Patent
Wang

(10) Patent No.: US 9,933,696 B2
(45) Date of Patent: Apr. 3, 2018

(54) METHODS FOR OPTIMIZING RETRO-REFLECTIVE DISPLAY SYSTEMS

(71) Applicant: MIRRAVIZ, INC., Sunnyvale, CA (US)

(72) Inventor: Michael W. Wang, Sunnyvale, CA (US)

(73) Assignee: MIRRAVIZ, INC., Sunnyvale, CA (US)

( * ) Notice: Subject to any disclaimer, the term of this patent is extended or adjusted under 35 U.S.C. 154(b) by 0 days.

(21) Appl. No.: 15/359,521

(22) Filed: Nov. 22, 2016

(65) Prior Publication Data

US 2017/0160631 A1 Jun. 8, 2017

Related U.S. Application Data

(63) Continuation of application No. PCT/US2015/032757, filed on May 27, 2015.

(Continued)

(51) Int. Cl.
*G03B 21/60* (2014.01)
*G02B 5/124* (2006.01)
(Continued)

(52) U.S. Cl.
CPC ............ *G03B 21/60* (2013.01); *G02B 5/124* (2013.01); *G03B 21/606* (2013.01); *G03B 35/20* (2013.01)

(58) Field of Classification Search
CPC ...... G03B 21/60; G03B 21/606; G02B 5/124; G02B 27/2235

(Continued)

(56) References Cited

U.S. PATENT DOCUMENTS 3,817,596 A 6/1974 Tanaka
4,775,219 A 10/1988 Appeldorn et al.
(Continued)

FOREIGN PATENT DOCUMENTS

EP 1213597 A2 6/2002
EP 1408349 A2 4/2004
(Continued)

OTHER PUBLICATIONS

International Search Report dated Aug. 28, 2015 for International Application No. PCT/US2015/032757.

(Continued)

*Primary Examiner* — Christopher Mahoney
(74) *Attorney, Agent, or Firm* — Wilson Sonsini Goodrich & Rosati

(57) ABSTRACT

The present disclosure provides a display system comprising a retro-reflective screen having retro-reflective screen elements that reflect incident light. Each of the retro-reflective screen elements can include three intersecting planes. At least one of the three intersecting planes intersects an adjacent plane at an angle that is 90° with an offset greater than 0°. The display system can further include at least one projector that projects the light onto the retro-reflective, which light characterizes an image or video. The retro-reflective screen having the retro-reflective screen elements can reflect the light at a cross-talk that is decreased by at least 10% and/or an intensity that is increased by at least 5%, as compared to a retro-reflective screen with retro-reflective screen elements having planes that each intersects an adjacent plane at an angle of 90° without the offset.

17 Claims, 28 Drawing Sheets

Related U.S. Application Data

(60) Provisional application No. 61/997,206, filed on May 27, 2014.

(51) Int. Cl.
    *G03B 21/606*     (2014.01)
    *G03B 35/20*     (2006.01)

(58) Field of Classification Search
    USPC .................................................. 359/459, 529
    See application file for complete search history.

(56) References Cited

U.S. PATENT DOCUMENTS

| | | |
|---|---|---|
| 5,763,049 A | 6/1998 | Frey et al. |
| 6,323,999 B1 | 11/2001 | Ueda et al. |
| 6,767,102 B1 | 7/2004 | Heenan et al. |
| 7,018,573 B2 * | 3/2006 | Wulff ...................... B29C 55/04 264/1.9 |
| 7,261,424 B2 | 8/2007 | Smith |
| 7,370,981 B2 | 5/2008 | Couzin |
| 7,561,330 B2 * | 7/2009 | Goto ...................... G03B 21/10 353/79 |
| 2005/0141092 A1 | 6/2005 | Couzin |
| 2011/0216411 A1 | 9/2011 | Reed et al. |
| 2013/0342813 A1 | 12/2013 | Wang |

FOREIGN PATENT DOCUMENTS

| | | |
|---|---|---|
| JP | 2009053713 A | 3/2009 |
| KR | 19980035761 U | 8/1998 |

OTHER PUBLICATIONS

Yoder, P.R., Study of Light Deviation Errors in Triple Mirrors and Tetrahedral Prisms, J. Opt. Soc. Am. 48, 496-499 (1958).

European Search Report dated Dec. 4, 2017 for European Patent Application No. EP15803116.1.

\* cited by examiner

METHODS FOR OPTIMIZING RETRO-REFLECTIVE DISPLAY SYSTEMS

CROSS-REFERENCE

This application is a bypass continuation of PCT Application Ser. No. PCT/US2015/032757, filed May 27, 2015, which claims priority to U.S. Provisional Patent Application Ser. No. 61/997,206, filed May 27, 2014, which are entirely incorporated herein by reference.

BACKGROUND

Current state-of-the-art display systems generally consist of either flat-panel displays or projector-based displays. The flat-panel displays are generally based on liquid crystal display (LCD) pixels with light emitting diode (LED) backlighting or plasma-based screens. In some cases it is difficult to attain screen sizes significantly larger than 80 inches in the diagonal dimension due to various considerations. For flat-panel displays, nonlinear increases in cost as the screen size grows, as well as high power consumption, may limit screen sizes to below 80 inches at typical consumer price points. For projection-based displays, decreasing screen brightness and increasing power consumption, projector size and projector noise, may be significant limitations if the screen size is increased above 80 inches. Additionally, for both types of displays there is currently no optimal solution for glasses-free three-dimensional (3D) immersive viewing. Current 3D display systems rely on either active or passive glasses, or require the viewer to be located in a substantially constrained region of space in line-of-sight of the display.

SUMMARY

The present disclosure provides display systems and methods that address various limitations of other displays systems and current available. A display system of the present disclosure can include a projector and a retro-reflective screen, which can provide various non-limiting benefits over other systems currently available. For example, systems of the present disclosure may provide an immersive multiplayer gaming experience that does not currently exist with display systems currently available. As another example, systems of the present disclosure provide customized large area displays for advertising or other applications where it may be beneficial for multiple users to observe unique streams of media, in some cases at the same time. As another example, a display system of the present disclosure can permit multiple viewers to view individual customized image or video streams on the same screen, in some cases simultaneously, as well as a glasses-free 3D immersive viewing capability.

The present disclosure provides display systems utilizing a projector and a retro-reflective screen. Such display systems comprise a projector combined with a retro-reflective screen and a viewer distance from the projector such that an observation angle is substantially small, in some cases less than approximately 10 degrees, 5 degrees, 4 degrees, 3 degrees, 2 degrees, or 1 degree. In cases where an incident angle is large, there can be degradation of retro-reflected image intensity resulting in reduced image brightness and reduced image uniformity. This situation can often occur near the edges of a retro-reflective screen.

The present disclosure provides systems and methods to enable significant improvements in display systems utilizing a projector and a retro-reflective screen through optimization of the retro-reflective screen elements in order to customize the retro-reflected spatial profile. The nature of retro-reflective display system can enable significantly improved image brightness in comparison to a standard projector/reflective screen system. However, depending on the specific viewer-to-projector and viewer-to-screen distances for a given application, further optimization of the angular distribution of retro-reflected light can significantly improve both the intensity of light reaching a viewer's eyes as well as improvement in the ability to optimize a ratio of light intensity reaching each eye for glasses-free 3D applications.

An aspect of the present disclosure provides a method for engineering and customizing the retro-reflective screen elements of the retro-reflective screen such that multiple return angles are achieved and combined in order to provide for specific display applications, in some cases by meeting desired properties for each specific display application. Examples include: 1) a vertically offset and vertically spread retro-reflected light distribution for 3D immersive head mounted applications, wherein the intensity, cross-talk and range of viewing distances are improved, 2) a vertically offset and horizontally spread-reflected light distribution for large area retroreflective display applications to enable intensity increase and an increased viewing angle, and 3) a spread of retro-reflected light distribution to optimize intensity increase for a single projector head-mounted system. In these examples, image properties such as brightness and 3D cross-talk for projected images can be significantly improved over the baseline performance of a retro-reflective display system that does not employ this method.

In another aspect of the present disclosure, a display system comprises a retro-reflective screen having retro-reflective screen elements that reflect incident light, wherein each of the retro-reflective screen elements comprises three intersecting planes, wherein at least one of the three intersecting plane intersects an adjacent plane at an angle that is 90° with an offset greater than 0°; and at least one projector that generates light characterizing an image or video and projects the light onto the retro-reflective screen, wherein the retro-reflective screen having the retro-reflective screen elements reflects the light at an optical cross-talk that is decreased by at least 10% and/or an intensity that is increased by a factor of at least 1.1, as compared to a retro-reflective screen with retro-reflective screen elements having planes that each intersects an adjacent plane at an angle of 90° without the offset.

In some embodiments, each of at least two of the three intersecting planes intersects an adjacent plane at an angle that is 90° with an offset greater than 0°. In some embodiments, each of the three intersecting plane intersects an adjacent plane at an angle that is 90° with an offset greater than 0°. In some embodiments, the offset is at least about 0.1°. In some embodiments, the offset is at least about 0.3°. In some embodiments, the offset is at least about 0.5°.

In some embodiments, the projector projects the light onto the retro-reflective screen without passage through a beam splitter. In some embodiments, the retro-reflective screen reflects the light from the projector to a viewer without the passage of light through a beam splitter. In some embodiments, the retro-reflective screen reflects the light from the projector to a viewer at an observation angle that is less than about 3°. In some embodiments, the projector is mountable on a body of a viewer. In some embodiments, the projector is mountable on a head of a viewer. In some embodiments, the retro-reflective screen comprises truncated corner cube reflectors.

In some embodiments, the display system further comprises a sound system for providing sound to complement the image or video. In some embodiments, the image or video is three-dimensional. In some embodiments, the optical cross-talk is decreased by at least 20%. In some embodiments, the optical cross-talk is decreased by at least 30%. In some embodiments, the optical cross-talk is decreased by at least 40%. In some embodiments, the optical cross-talk is decreased by at least 50%.

In some embodiments, the factor is at least 1.5. In some embodiments, the factor is at least 2. In some embodiments, the factor is at least 5. In some embodiments, the factor is at least 8. In some embodiments, the factor is at least 10.

In some embodiments, the retro-reflective screen having the retro-reflective screen elements reflects the light at an optical cross-talk that is decreased by at least 10% and an intensity that is increased by a factor of at least 1.1. In some embodiments, a first plane of the three intersecting plane intersects an adjacent plane at an angle that is 90° with a first offset greater than 0°, a second plane of the three intersecting plane intersects an adjacent plane at an angle that is 90° with a second offset greater than 0°, wherein the first offset is different from the second offset. In some embodiments, a third plane of the three intersecting plane intersects an adjacent plane at an angle that is 90° with a third offset greater than 0°, wherein the third offset is different from the first or second offset. In some embodiments, the third offset is different from the first offset and second offset. In some embodiments, the retro-reflective screen elements reflect the light at multiple return angles.

In another aspect of the present disclosure, a display system comprises a retro-reflective screen having retro-reflective screen elements that reflect incident light, wherein each of the retro-reflective screen elements comprises three intersecting planes, wherein at least one of the three intersecting plane intersects an adjacent plane at an angle that is 90° with an offset greater than 0°; and at least one projector that generates light characterizing an image or video and projects the light onto the retro-reflective, wherein the retro-reflective screen having the retro-reflective screen elements reflects the light at an optical cross-talk that is less than 50%.

In some embodiments, the optical cross-talk is less than 30%. In some embodiments, the optical cross-talk is less than 1%. In some embodiments, the retro-reflective screen elements reflect the light at multiple return angles.

In yet another aspect of the present disclosure, a method for projecting an image or video for view by a viewer comprises providing a retro-reflective screen having retro-reflective screen elements that reflect incident light, wherein each of the retro-reflective screen elements comprises three intersecting planes, wherein at least one of the three intersecting plane intersects an adjacent plane at an angle that is 90° with an offset greater than 0°; and directing light characterizing an image or video from a projector to the retro-reflective screen, wherein the retro-reflective screen having the retro-reflective screen elements reflects the light at an optical cross-talk that is decreased by at least 10% and/or an intensity that is increased by a factor of at least 1.1, as compared to a retro-reflective screen with retro-reflective screen elements having planes that each intersects an adjacent plane at an angle of 90° without the offset.

In some embodiments, the retro-reflective screen reflects the light from the projector to the viewer without use of a beam splitter. In some embodiments, the projector is mounted on the body of the viewer. In some embodiments, the projector is mounted on a head of the viewer. In some embodiments, the method further comprises the viewer with sound to complement the image or video. In some embodiments, the image or video is three-dimensional.

In another aspect of the present disclosure, a method for projecting an image or video for view by a viewer comprises providing a retro-reflective screen having retro-reflective screen elements that reflect incident light, wherein each of the retro-reflective screen elements comprises three intersecting planes, wherein at least one of the three intersecting plane intersects an adjacent plane at an angle that is 90° with an offset greater than 0°; and directing light characterizing an image or video from a projector to the retro-reflective screen, wherein the retro-reflective screen having the retro-reflective screen elements reflects the light at an optical cross-talk that is less than 50%. In some embodiments, the optical cross-talk is less than 30%. In some embodiments, the optical cross-talk is less than 1%.

In yet another aspect of the present disclosure, a method for projecting an image or video comprises directing light characterizing an image or video from a projector to a retro-reflective screen in optical communication with the projector, wherein upon the directing, the light is reflected from the retro-reflective screen at an observation angle less than about 3° at a distance of at least about 2 feet from the retro-reflective screen, and is viewable by a viewer at an optical cross-talk that is less than 50%. In some embodiments, the light is viewable by a plurality of viewers. In some embodiments, the plurality of viewers is at different locations with respect to the retro-reflective screen.

In another aspect of the present disclosure, a method for projecting an image or video for view by a viewer comprises using a projector to generate light characterizing an image or video; and directing the light from the projector to a retro-reflective screen in optical communication with the projector, wherein the retro-reflective screen has retro-reflective screen elements that reflect the light, such that the light reflected by the retro-reflective screen elements is viewable by a viewer at an observation angle less than about 3° at a distance of at least about 2 feet from the retro-reflective screen and optical cross-talk that is less than 50%.

In some embodiments, the retro-reflective screen reflects the light from the projector to the viewer without use of a beam splitter. In some embodiments, the observation angle is less than about 2°. In some embodiments, the projector is mounted on the body of the viewer.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity. A better understanding of the features and advantages of the present invention will be obtained by reference to the following detailed description that sets forth illustrative embodiments, in which the principles of the invention are utilized, and the accompanying drawings (also "figure" and "FIG." herein), of which.

DETAILED DESCRIPTION

Figure 1:
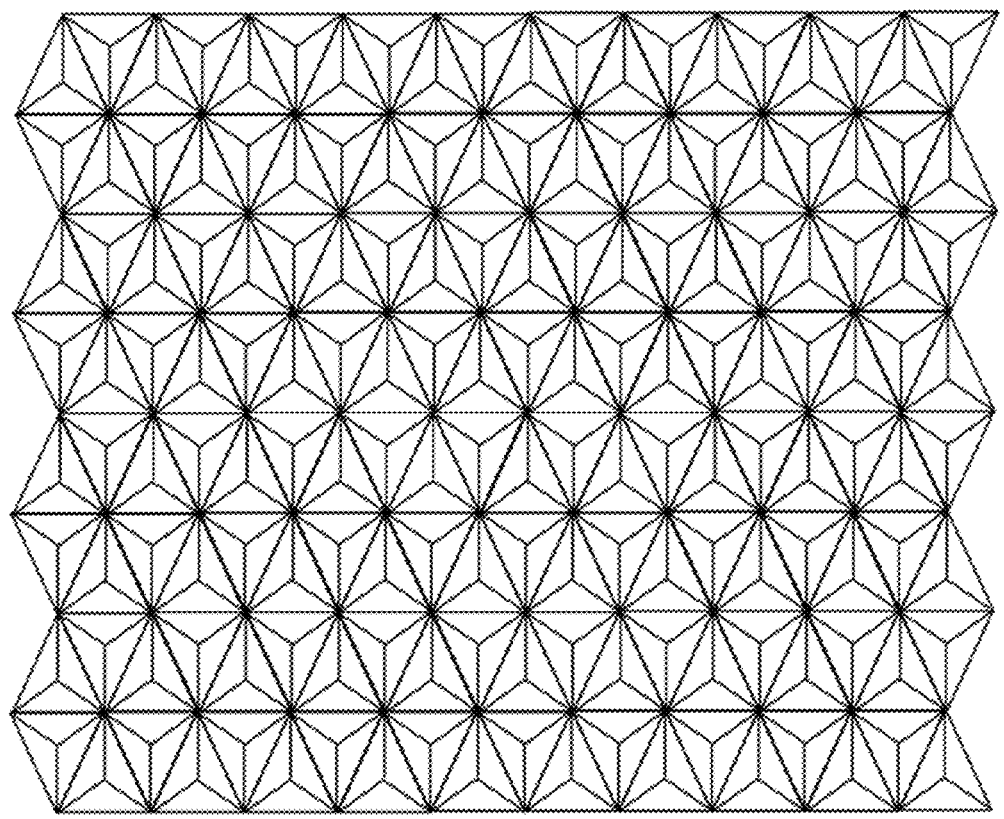
FIG. 1 schematically shows a magnified front view of a representative retro-reflective screen.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

The term "retroreflective" (also "retro-reflective" or "retro reflective" herein), as used herein, generally refers to a device or surface that reflects light back to its source with a minimum scattering of light. In a retroreflective screen, an electromagnetic wave is reflected back along a vector that is parallel to but opposite in direction from the source of the wave. A retroreflective screen comprises a retroreflective surface comprised of many small individual corner cube reflective elements.

The term "corner cube reflective element", as used herein, generally refers to a reflective partial cube composed of three mutually perpendicular, nearly perpendicular, or angled flat reflective surfaces. With this geometry, incident light is reflected back directly towards the source.

The term "projector," as used herein, generally refers to a system or device that is configured to project (or direct) light. The projected light can project an image and/or video.

The term "observation angle," as used herein, generally refers to an angle between a first line directed from a projector to a given location on a screen and a second line from that same location on the screen to one or more eyes of a viewer.

The term "return angle," as used herein, generally refers to the angle between an incident beam of light and the reflected beam of light from a screen. For a typical surface, the return angle has a broad range of values. For a retroreflective screen that has not been formed as described herein, the return angle typically has a very small spread of angles centered around zero.

The term "incidence angle," as used herein, generally refers to an angle between a first line directed from a projector to a given location on a screen and a second line that is normal to the nominal front surface of the corner cube. The nominal front surface of the corner cube is defined as the surface perpendicular to and intersecting the midpoint of a line from the corner of the corner cube structure to the hypothetical opposite corner of the cube if the corner cube were to have been a full cube.

The term "optical cross-talk" (also "cross-talk" herein), as used herein, generally refers to retro-reflected light from a projector that reaches a viewer (or eye of a viewer) that was not intended to receive the light. This can result in a poor 3D viewing experience exhibited by "ghosting" which is a term used herein to describe double images seen by viewers where only one image is intended. The term "perceived cross-talk" as used herein, generally refers to the ratio of the intensity of undesired retro-reflected light from a projector that reaches a viewer (or eye of a viewer) relative to the intensity of desired retro-reflected light. There may be scenarios where absolute cross-talk intensity has decreased, but the intensity of desired light has decreased by an even larger amount, resulting in worsening in perceived cross-talk.

The present disclosure provides a display system that permits multiple viewers to view individual customized video streams simultaneously on the same screen as well as a glasses free 3D immersive viewing capability. The display system can comprise a projector combined with a retro reflective screen and a viewer distance from the projector. In some cases, this can enable the observation angle (e.g., the line from the projector to a given location on the screen and the line from that same location on the screen to the eye or eyes of the viewer) to be less than approximately 1-3 degrees. In an example, at 1 degree, the intensity can be 3× lower as compared to the intensity at 0.5 degrees, and at 2 degrees the intensity drops by another factor of 3× as compared to the intensity at 1 degree—thus, the intensity at 2 degrees can be a factor 9× lower as compared to the intensity at 0.5 degrees. The brightness of the image on the screen of the display system can be increased by a factor of about 100 to 500 as compared to traditional display systems with an equivalent power or intensity of light source.

The present disclosure also provides methods for engineering and customizing retro reflective screen elements of retro reflective screen such that the incident angle to the corner cube reflective element has a distribution centered upon the normal incident angle. In this manner the brightness and uniformity of projected images can have improved uniformity.

Some retro-reflective screens used in retro-reflective display systems have an angular distribution centered on the light source. However, depending on the application, this may not be the ideal return angle for the retro-reflected light. Retro-reflective screens provided herein can provide an angular distribution that is not centered on the light source.

Optimization of Reflector Display Systems

The present disclosure provides a display system with a retro reflective screen having retro reflective screen elements that are engineered and customized such that brightness can be significantly improved above and beyond the already significant intensity increase enabled by baseline retro-reflective display systems. The display system can provide for a significant decrease in the perceived (or effective) cross-talk between light sources for multi-source retro-reflective display systems. The display system can be used with any retro-reflective display application where the observation angle is non-zero. The retro-reflective screen, which can be configured to reflect incident light along a direction that is substantially opposite to the direction of propagation of the incident, can enable significantly improved brightness. The incident light can be reflected along a direction that is generally opposite from the direction of propagation, such as non-parallel or antiparallel. For example, the incident light is reflected along a direction that is from about 170°-190° with respect to the direction of propagation.

The display system can comprise a retro-reflective screen configured to reflect incident light along a direction that is substantially non-parallel (e.g., anti-parallel) to the direction of propagation of the incident light, and a projector for projecting light characterizing an image or video onto the retro-reflective screen without the passage of light through a beam splitter. The retro-reflective screen may reflect incident light from the projector to a viewer without the passage of light through either a beam splitter or any diffuser layers. The retro-reflective screen can reflect incident light from the projector to a viewer at an observation angle that is less than or equal to about 20°, 15°, 10°, 9°, 8°, 7°, 6°, 5°, 4°, 3°, 2°, 1.5°, 1°, 0.5°, 0.4°, 0.3°, 0.2°, or 0.1°. The observation angle can be between about 0.1° and 10°, or 0.2° and 3° The display system can operate without the need of a beam splitter, thereby advantageously providing for reduced complexity and/or cost as well as avoiding at least a 2x, 3x, 4x or greater reduction in intensity compared to a system using a beam splitter.

The retro-reflective screen can minimize cross-talk. Cross-talk can be at most about 20%, 15%, 10%, 5%, 4%, 3%, 2%, 1%, or 0.5%. In some cases, cross-talk is from about 0.1% to 20%, or 0.5% to 10%.

The observation angle can be a function of the distance of the user from the retro-reflective screen. In some embodiments, the observation angle is less than about 5°, 4°, 3°, 2°, 1.5°, 1°, 0.5°, 0.4°, 0.3°, 0.2°, or 0.1° when the user is at a distance of at least about 1 foot, 2 feet, 3 feet, 4 feet, 5 feet, 6 feet, 7 feet, 8 feet, 9 feet, or 10 feet from the retro-reflective screen. In an example, the observation angle can be less than about 3° when the user is at a distance of at least about 4 feet from the retro-reflective screen. In some cases, the intensity of reflected light from the retro-reflected screen is a maximum at observation angle of about 0°, and decreases with increasing observation angle.

In an aspect, a display system comprises a retro-reflective screen having retro-reflective screen elements that reflect light along a direction that is substantially non-parallel to the direction of propagation of the light. Each of the retro-reflective screen elements comprises at least three intersecting planes (e.g., in the form of a pyramidal structure or truncated pyramidal structure). At least one of the three intersecting planes can intersect an adjacent plane (e.g., of the same retro-reflective screen element) at an angle that is 90° with an offset greater than 0°. The system further comprises at least one projector that projects the light onto the retro-reflective, which light characterizes an image or video. The retro-reflective screen having the retro-reflective screen elements reflects the light with optical cross-talk that is decreased by at least 10% and/or an intensity that is increased by at least 5%, as compared to a retro-reflective screen with retro-reflective screen elements having planes that each intersects an adjacent plane at an angle of 90° without the offset. The retro-reflective screen can include truncated corner cube reflectors.

In some cases, the system comprises multiple projects. For example, the system can include two projectors that provide a stereoscopic image or video for 3D viewing.

The system can provide for minimized cross-talk and improved intensity relative to other systems. In situations in which one projector is used, there may be no cross-talk, but the system can provide improved intensity. This can allow a more customizable location for a viewer relative to the projector. In situations in which two or more projectors are used, the system may provide for a reduction in cross-talk and improvement in intensity.

The cross-talk can be determined using a plot of intensity of light reflected from the retro-reflective screen as a function of viewing angle. This can be used to compare the intensity of light received by the intended eye/viewer from the intended source and comparing to the intensity of light received by the same eye/viewer from another source that is not intended to be viewed by that eye/viewer. A decrease in cross-talk can be assessed by generating such plots for various retro-reflective screen and projector configurations, and comparing an overlap of intensity distributions. Cross-talk may be viewed as the ratio of image/video intensity from an undesired/unintended source versus the image/video intensity coming from the desired/intended source.

The image or video can be three-dimensional. For example, the image or video is rendered by more than one projector such that, upon reflection by the retro-reflective screen, the image or video is three-dimensional. In some cases, the image or video is three-dimensional without the use of any optics, such as 3D glasses.

Each of at least one, two or all three of the three intersecting planes can intersect a plane of an adjacent retro-reflective screen element at an angle that is 90° with an offset greater than 0°. The offset can be at least about 0.01°, 0.05°, 0.1°, 0.15°, 0.2°, 0.3°, 0.4°, 0.5°, 1°, 2°, 3°, 4°, 5° or 10°. In some cases, the offset is between about 0.01° and 5°, or 0.1° and 1°. In some examples, the offset is from about 0.1° to 1.5°; below 0.1 may not yield much change in profile, whereas above 1.5° may yield a loss intensity. The offset can be as described elsewhere herein.

The projector can project the light onto the retro-reflective screen without passage through a beam splitter. The retro-reflective screen can reflect the light from the projector to a viewer without the passage of light through a beam splitter. Thus, a beam splitter can be precluded from the display system.

The projector can be mountable on a body of a viewer. In some examples, the projector is mountable on a head of the viewer. The projector can be mountable with a support member, such as body or head support member (e.g., support strap(s)). The projector can also be mounted at a fixed location, independent of the viewer such that a viewer may enter the range of the projector.

The display system can include a sound system for providing sound to complement the image or video. The sound can go along with a viewer's viewing experience, such as by way of headphones or other local speaker system.

The retro-reflective can have various sizes and configurations. The screen can be substantially flat or curved. The screen can have a width of at least about 1 meter (m), 10 m, or 50 m, and a height of at least about 1 m, 10 m or 50 m. In large area settings, a large area display can be effective for advertising purposes, or other showcase demonstrations, due, at least in part, to the qualities of the display size and having multiple images/videos on the same screen area.

The optical cross-talk can be decreased by at least 1%, 2%, 3%, 4%, 5%, 10%, 20%, 30%, 40%, 50%, or even nearly 100% as compared to a retro-reflective screen with retro-reflective screen elements having planes that each intersects a plane of an adjacent retro-reflective screen element at an angle of 90° without the offset. The retro-reflective screen elements can reflect the light at an optical cross-talk that is less than 50%, 40%, 30%, 20%, 10%, 5%, 1%, or 0.1%. The intensity of the image/video for the intended eye/viewer can be increased by a factor of at least 1.1×, 1.2×, 1.3×, 1.4×, 1.5×, 2×, 2.5×, 3×, 4×, 5×, 6×, 7×, 8×, 9×, 10×, or 20× as compared to a retro-reflective screen with retro-reflective screen elements having planes that each intersects a plane of an adjacent retro-reflective screen element at an angle of 90° without the offset. In some examples, the retro-reflective screen element reflects the light such that optical cross-talk between two sources and corresponding viewer eyes is decreased by at least 1%, 2%, 3%, 4%, 5%, 10%, 20%, 30%, 40%, 50%, or nearly 100%, and an effective intensity that is increased by a factor of at least 1.1×, 1.2×, 1.3×, 1.4×, 1.5×, 2×, 2.5×, 3×, 4×, 5×, 6×, 7×, 8×, 9×, 10×, or 20×.

In some examples, a first plane of the three intersecting plane intersects an adjacent plane of the retro-reflective screen element at an angle that is 90° with a first offset greater than 0° in either direction from the nominal 90% angle, and a second plane of the three intersecting plane intersects a plane of an adjacent retro-reflective screen element at an angle that is 90° with a second offset greater than 0°. The first offset can be different from the second offset. Alternatively, the first offset can be the same as the second offset. In some cases, a third plane of the three intersecting plane intersects a plane of an adjacent retro-reflective screen element at an angle that is 90° with a third offset greater than 0°. The third offset can be different from the first offset, second offset, or first and second offsets. Alternatively, the third offset can be the same as the first offset, second offset, or first and second offsets.

FIG. 1 shows a front view of a representative retro-reflective screen. The retro-reflective screen is comprised of an array of truncated corner cube reflectors. The corner cube reflectors may also be comprised of alternative geometries. Examples of corner cube reflectors are provided in U.S. Pat. No. 5,763,049 to Frey et al. and U.S. Pat. No. 7,261,424 to Smith, which patents are entirely incorporated herein by reference. In some embodiments, the size of each of the corner cube reflectors is smaller than the anticipated or predicted pixel size of the projected image, with the pixel size determined by the combination of the projector display system and the distance of the projector from the retroreflective screen.

Figure 28:
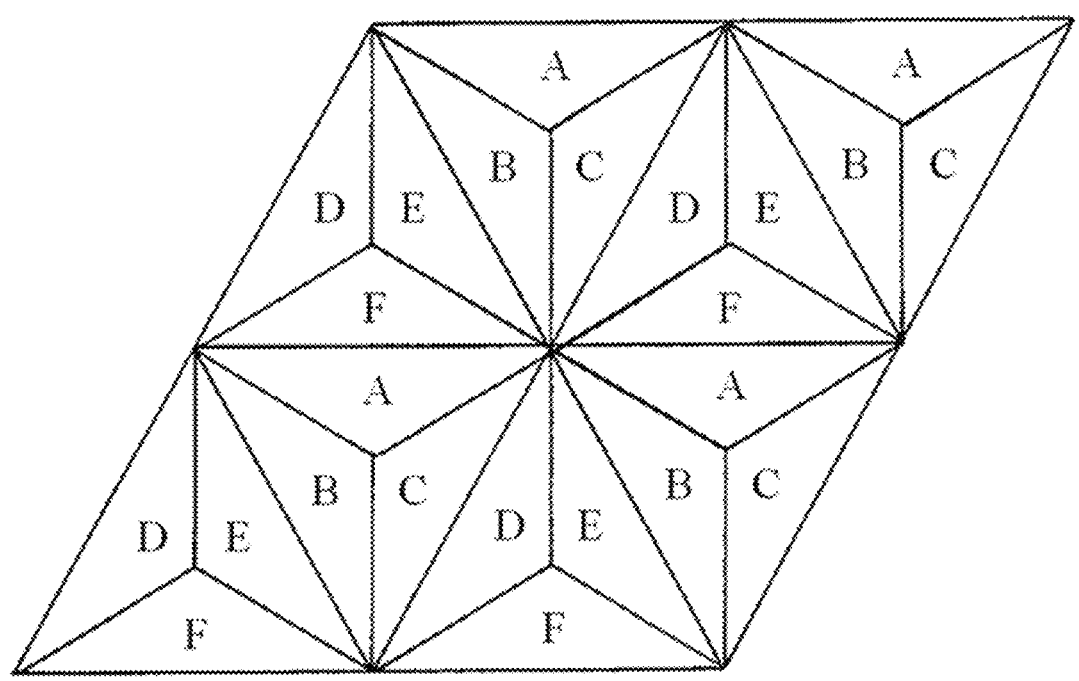
FIG. 28 schematically illustrates a retro-reflective screen with retro-reflective screen elements having intersecting planes.

A retro-reflective screen can include retro-reflective screen elements having intersecting planes. This is schematically illustrated in FIG. 28, which shows pyramidal retro-reflective screen elements with intersecting planes A-F. Planes of adjacent elements may intersect one another at an angle that is 90°. For example, Planes B and C at the bottom left-hand portion of the schematic intersect at an angle of 90°. In some cases, at least one of three intersecting planes can intersect an adjacent plane (e.g., of the same retro-reflective screen element) at an angle that is 90° with an offset greater than 0°. For example, the D plane at the bottom left-hand portion of FIG. 28 can intersect the E plane at an angle that is 90° with an offset greater than 0°.

Figure 2:
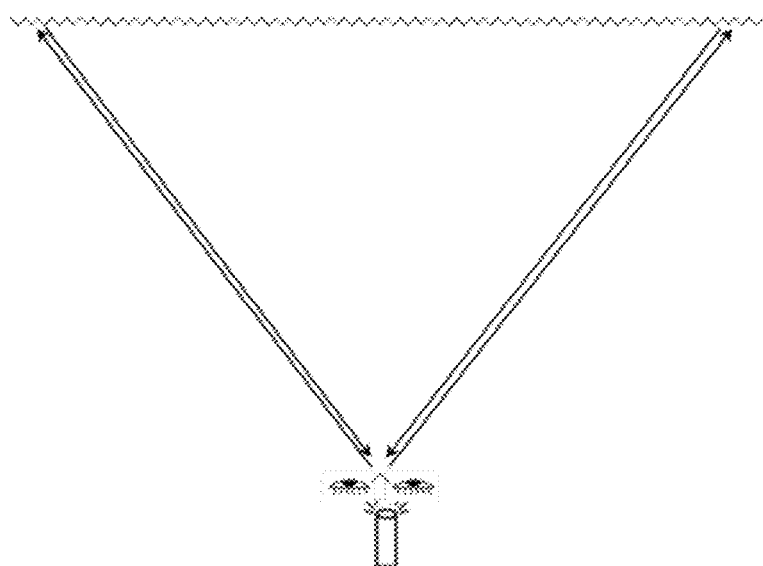
FIG. 2 schematically shows a top view of a representative retro-reflective screen and projector system with the viewer facing the screen.

FIG. 2 shows a schematic top view of a system having a projector and a retro-reflective screen. The retro-reflective properties of the screen cause a majority of the light incident upon the screen to be reflected back towards the projector in a tight directional cone of light regardless of the incident angle. This is in contrast to some conventional screens which scatter incident light in a relatively isotropic manner. In such a conventional screen set up only a very small fraction of the light incident on the screen actually impinges upon the viewer's eyes. Because of the retroreflective effect with this type of system, if the viewer's eye is in close proximity to the projector such that the angle defined by the path from the projector to the reflective screen and returning to the viewer's eye is small, then the brightness of the image may be increased significantly over a conventional projector and reflective screen set up. The system of FIG. 2 in some cases does not have a beam splitter.

Figure 3:
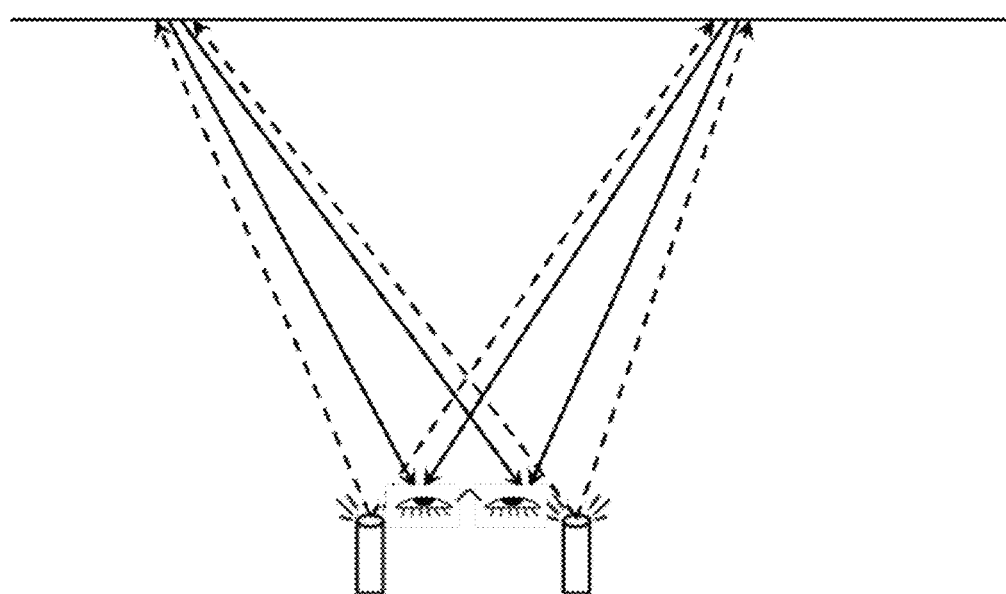
FIG. 3 schematically shows a top view of a representative retro-reflective screen and projector system utilizing two projectors, with one projector in proximity to each eye.

FIG. 3 schematically shows a top view of a representative retro-reflective screen and projector system with the use of two projectors in order to obtain a stereoscopic effect. In this setup, the image projected from the right projector may predominantly be seen by the right eye and similarly for the left projector and left eye. A goal in this type of display setup may be to minimize the brightness of the image from the right projector to the left eye and from the left projector to the right eye (also referred to as "cross-talk"). If cross-talk and perceived cross-talk can be sufficiently minimized, then a glasses free 3D can be enabled.

FIG. 3 is a top view of a schematic describing the capability to have multiple users/eyes viewing independent image or video sources, in a retro-reflective display system. The retro-reflective screen can be configured to have a highly directional nature such that only eyes in close proximity to a given projector may be able to see the image or video being projected from that projector onto the retro-reflective screen.

Figure 4:
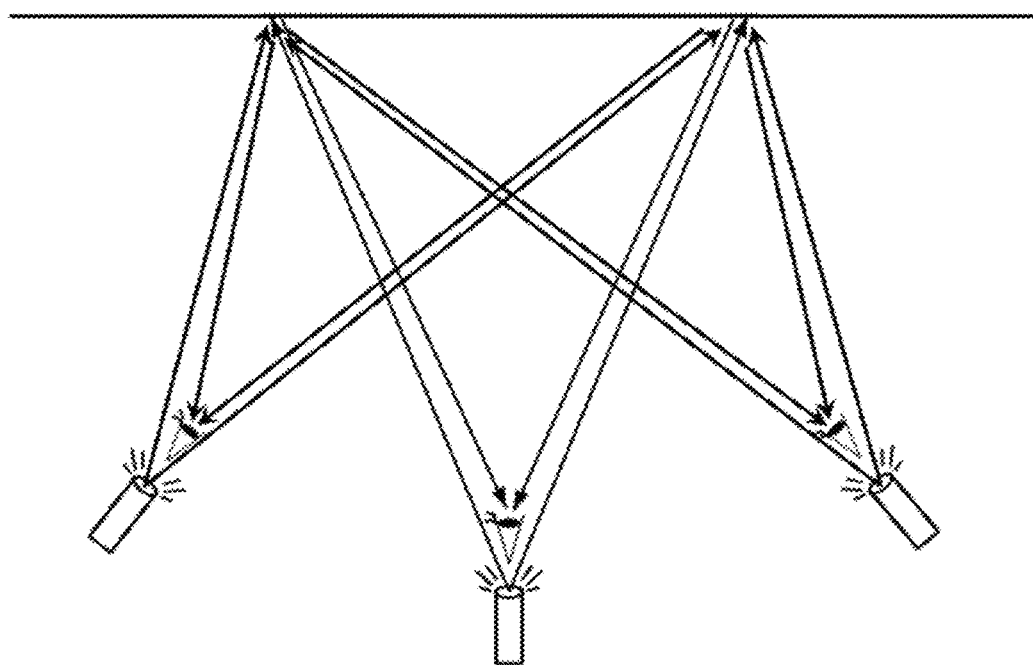
FIG. 4 shows a top view of a schematic showing the capability to have multiple users/eyes viewing independent image or video sources.

FIG. 4 is a top view of a schematic showing the capability to have multiple viewers viewing independent image or video sources. Projectors, light rays corresponding to projected light, and viewer eyes are illustrated in the figure.

Figure 5:
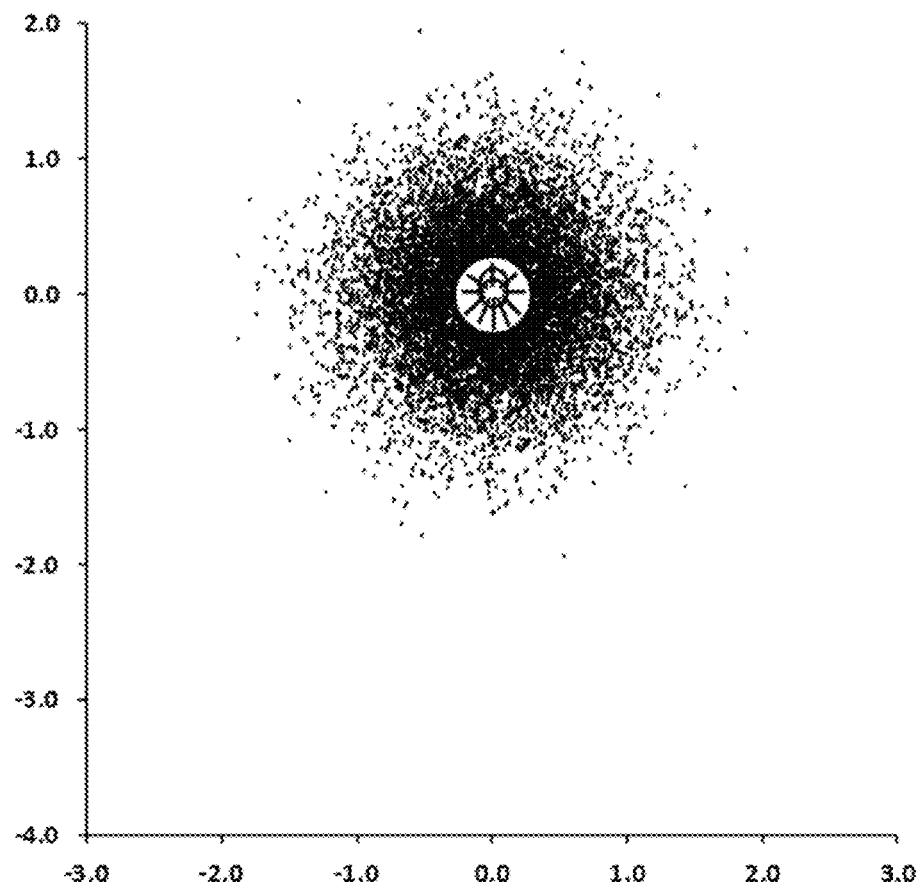
FIG. 5 shows Monte Carlo simulation results for the angular distribution of retro-reflected light from a representative retroreflective screen.

FIG. 5 shows Monte Carlo simulation results for the angular distribution of retro-reflected light from a representative retroreflective screen. The x-axis and y-axis on the chart enumerate the angle in degrees from the source, which in this chart has been placed at 0 degrees in the x-direction and 0 degrees in the y-direction (0, 0). The source has been represented schematically by the graphic drawn at this location. Twelve thousand light rays have been used in the Monte Carlo simulation with each point in the graph representing one light ray. Variation and non-perfect uniformity in the retroreflective screen have been emulated by inducing slight variations in the normal vector for each surface of the three reflective surfaces that comprise a retro-reflective corner cube element. The above description of the methodology used to generate a retro-reflected angular distribution profile applies to the following figures as well, with modifications to source locations and retro-reflective screen uniformity input parameters. In FIG. 5 it can be observed that the bulk of the light rays from the projector reflect back with a small return angle of 0-2 degrees. The distribution of return angles shown in FIG. 5 is representative only and actual return angles may have distribution profiles with a smaller or larger spread of angles depending on the specific properties of each retro-reflective screen.

Figure 6:
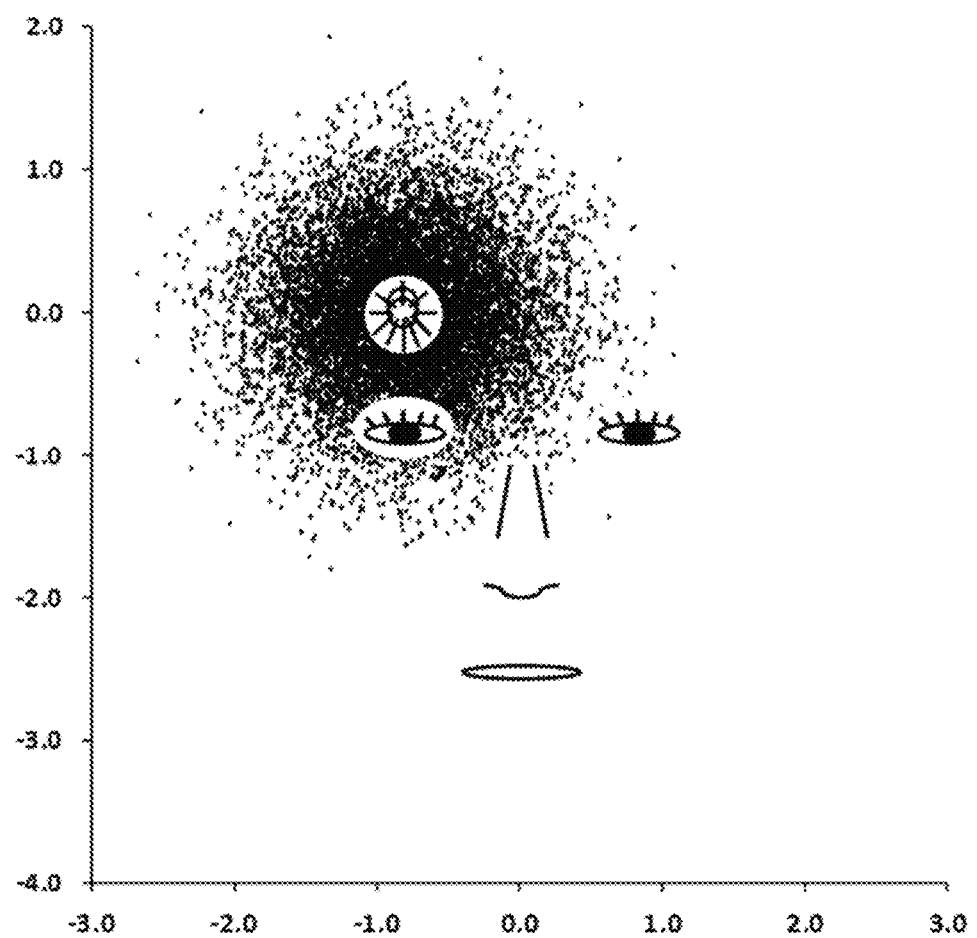
FIG. 6 shows Monte Carlo simulation results for the angular distribution of retro-reflected light from a representative single projector for a representative retroreflective screen with an overlay of eye positions for a representative viewer.

FIG. 6 shows Monte Carlo simulation results for the angular distribution of retro-reflected light from a representative single projector for a representative retroreflective screen with an overlay of eye and other facial positions for a representative viewer. In this graph, the viewer may be roughly 5 feet from the screen. In this scenario the projector has been placed in close proximity to one eye and is representative of half a system that may be used for an intended 3D glasses free retro-reflective display setup. In this Figure only part of the system is drawn and modeled in order to better visualize the retro-reflected light distribution to the other eye not in close proximity to the projector source. In FIG. 6, the intensity of light as indicated by the density of dots is much stronger for the viewer's right eye (left side of the graph) than for the viewer's left eye (right side of the graph). However, the viewer's left eye still receives some light and the viewer's right eye is already at an observation angle such that the intensity of light is rapidly diminishing.

Figure 7:
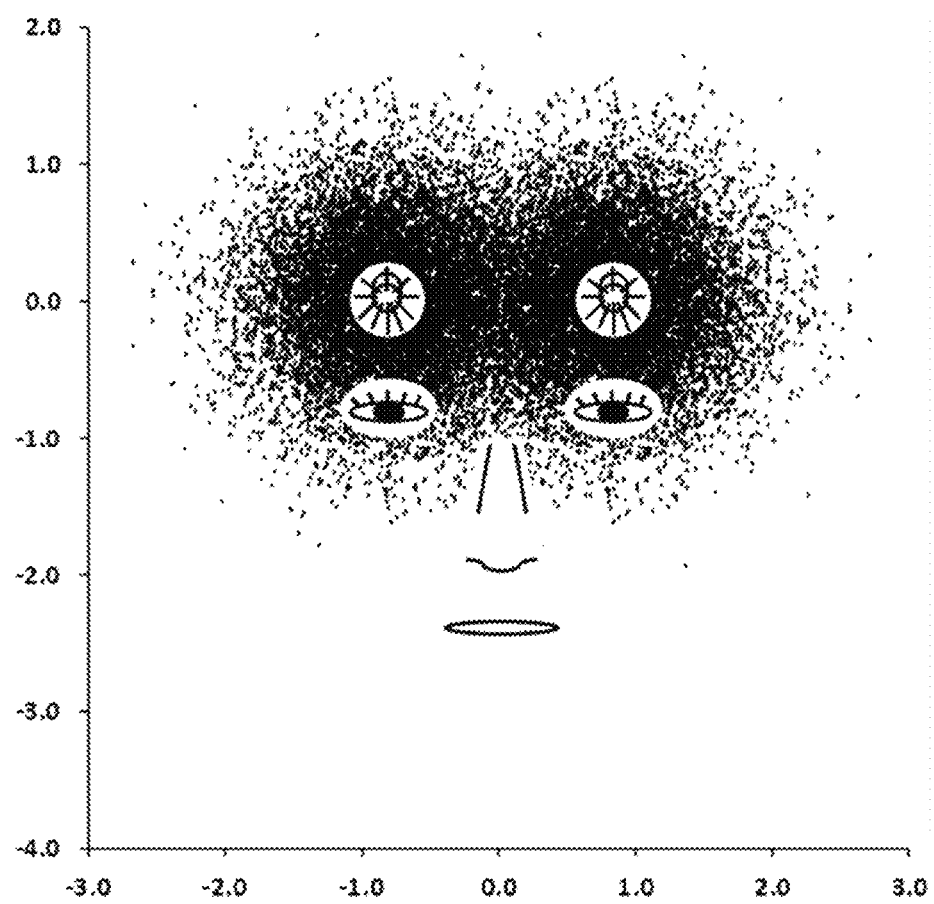
FIG. 7 shows Monte Carlo simulation results for the angular distribution of retro-reflected light from two projectors sources for a representative retroreflective screen with an overlay of facial positions for a representative viewer at a nominal distance of 2 meters from the screen.

FIG. 7 shows Monte Carlo simulation results for the angular distribution of retro-reflected light from a representative dual projector system for a representative retroreflective screen with an overlay of eye and other facial positions for a representative viewer. In this graph, the viewer may be roughly 5 feet from the screen. In this figure, the bulk of the light from each source may be retro-reflected predominantly to the eye closest to that source, but that some light still reaches the other eye, which may result in "cross-talk" and a poor 3D image.

Figure 8:
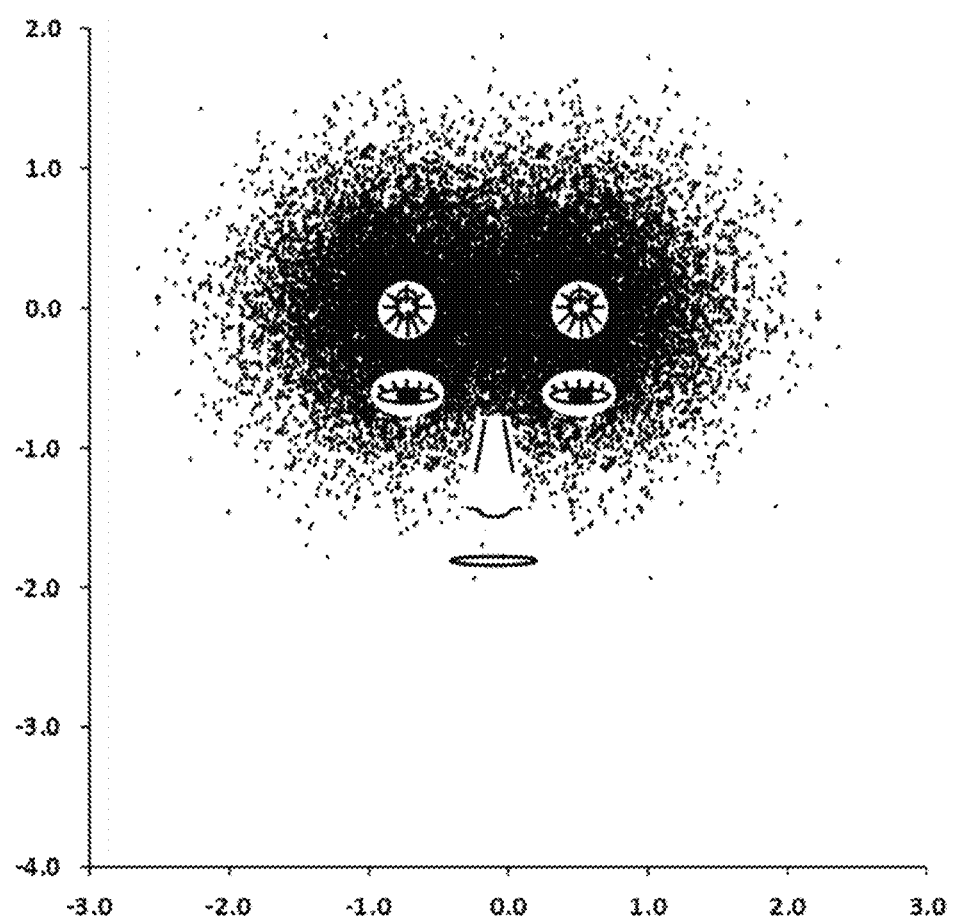
FIG. 8 shows Monte Carlo simulation results for the angular distribution of retro-reflected light from two projectors sources for a representative retroreflective screen with an overlay of facial positions for a representative viewer at a ~1.5× increased distance of from the screen than in FIG. 7.

FIG. 8 shows Monte Carlo simulation results for the angular distribution of retro-reflected light from two projectors sources for a representative retroreflective screen with an overlay of facial positions for a representative viewer at a ~1.5× longer distance with respect to the screen than in FIG. 7. In FIGS. 6 and 7, the viewer is roughly 5 feet from the screen. At larger distances from the screen the effective angle between features may be smaller and the overlay of the facial features may be smaller. Similarly, at smaller distances from the screen the effective angle between features may be smaller and the overlay of the facial features may be larger. Since the x and y axis in these charts are in degrees, the distribution of retro-reflected light relative to each projector does not change as a function of distance of the source and viewer from the screen. In this case, the left eye has a smaller effective return angle to the right projector which may result in a larger amount of light crossing over from each projector to the opposite eye which is undesirable for a high quality 3D image. While the intensity of light reaching the left eye from the left projector may also increase because of a similar decrease in that return angle, the relative increase in intensity may be less than the increase in intensity for the light reaching the left eye from the right projector, resulting in an increase in perceived cross-talk.

Figure 9:
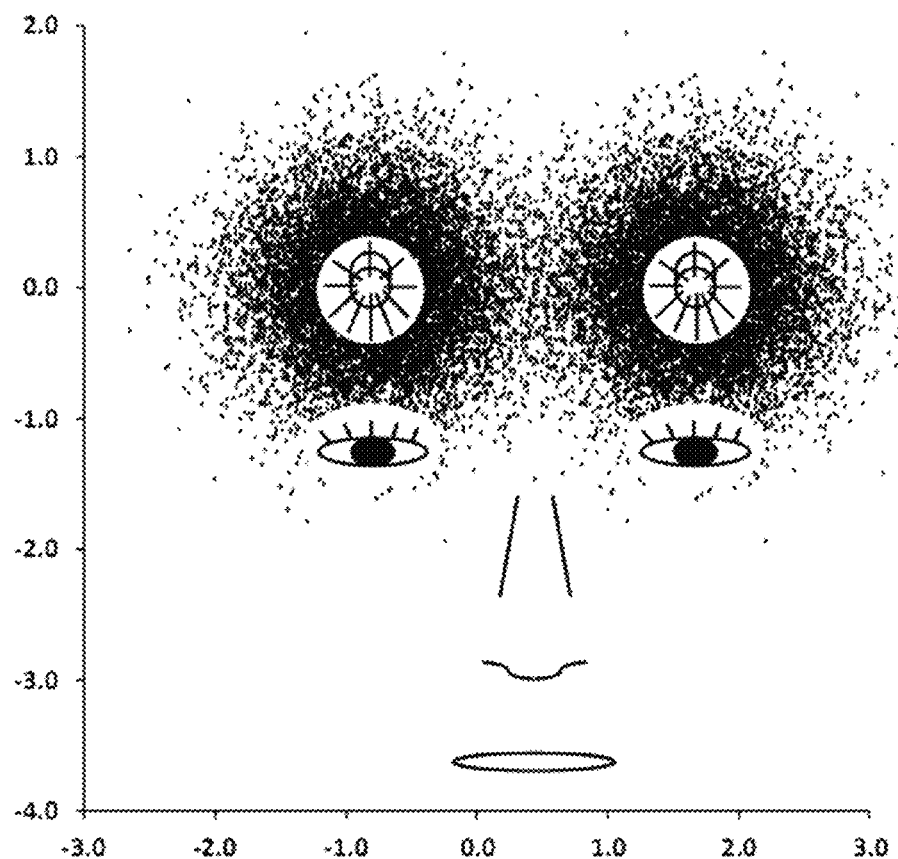
FIG. 9 shows Monte Carlo simulation results for the angular distribution of retro-reflected light from two projectors sources for a representative retroreflective screen with an overlay of facial positions for a representative viewer at a ~1.5× reduced distance of from the screen than in FIG. 7.

FIG. 9 shows Monte Carlo simulation results for the angular distribution of retro-reflected light from two projectors sources for a representative retroreflective screen with an overlay of facial positions for a representative viewer at a ~1.5× shorter distance with respect to the screen than in FIG. 7. In FIGS. 6 and 7, the viewer is roughly 5 feet from the screen. At smaller distances from the screen the effective angle between features may be larger and the overlay of the facial features may be larger. Since the x and y axis in these charts are in degrees, the distribution of retro-reflected light relative to each projector does not change as a function of distance of the source and viewer from the screen. In this case, the return angle from each project to the closest eye and the return angle from each project to the opposite eye have increased. The undesirable outcome of this is that while the intensity of light from the opposite projector may decrease, the intensity of light from the closer projector (as represented by the density of dots) is very significantly reduced, so effectively perceived cross-talk is not significantly reduced. In addition, overall image intensity is significantly impacted.

In actual practice, what may occur with the current state of art is that if a glasses free 3D viewing experience is desired, there may be a limited range of distances of the viewer to the screen where the 3D image is most optimal. If the viewer is too close to the screen, then overall image intensity may be reduced due to return angles being too large. If the viewer is too far from the screen then cross-talk from the opposite projector to each eye may become a significant problem and result in ghosting or double images.

Figure 10:
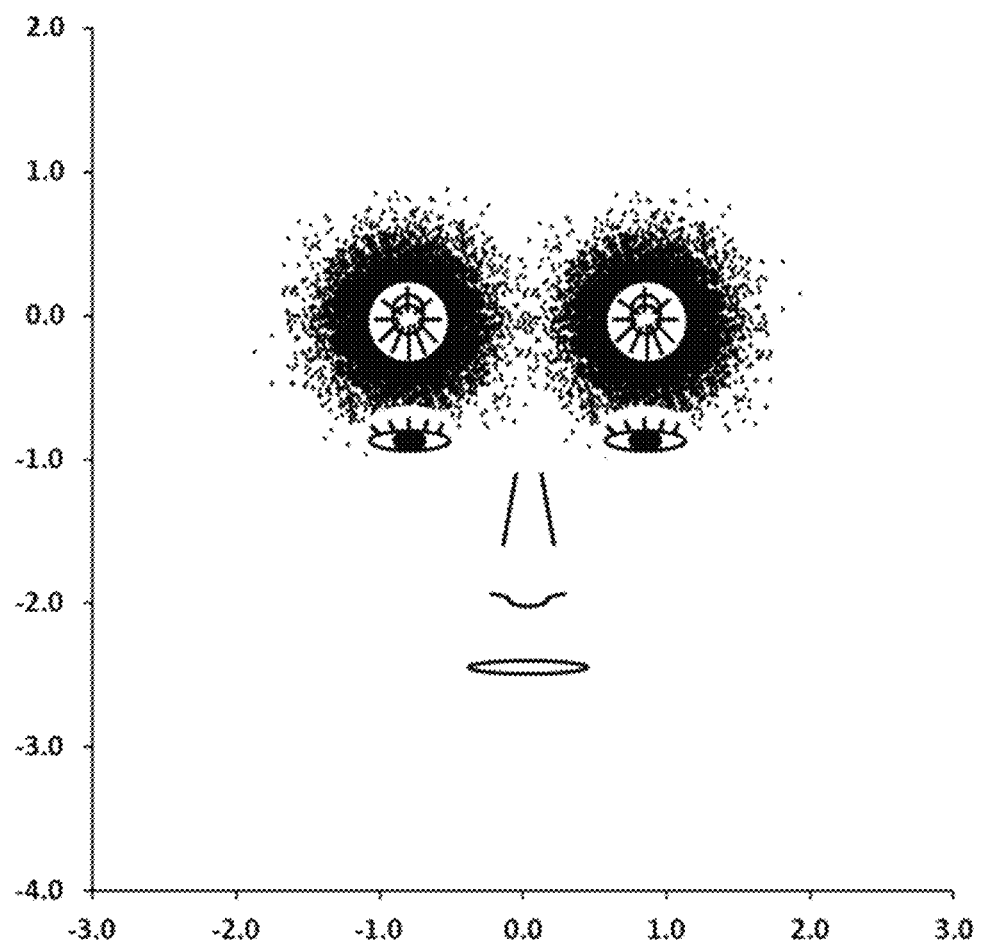
FIG. 10 shows Monte Carlo simulation results for the angular distribution of retro-reflected light from two projectors sources for a representative retroreflective screen with a reduced spread for retro-reflected light. Also in the figure is an overlay of eye positions for a representative viewer at a nominal distance of 2 meters from the screen.

FIG. 10 shows Monte Carlo simulation results for the angular distribution of retro-reflected light from two projectors sources for a representative retroreflective screen with an overlay of facial positions for a representative viewer at the same nominal distance from the screen as in FIG. 7. In FIG. 10, the model has been run with a improved effective uniformity for the retroreflective screen to test if the range of glasses free 3D can be improved by improving retroreflective screen uniformity. While cross-talk from each projector the opposite eye is reduced, the intensity of light reaching the eye closest to each projector is also significantly reduced, so this does not inherently solve the perceived cross-talk challenge.

Figure 11:
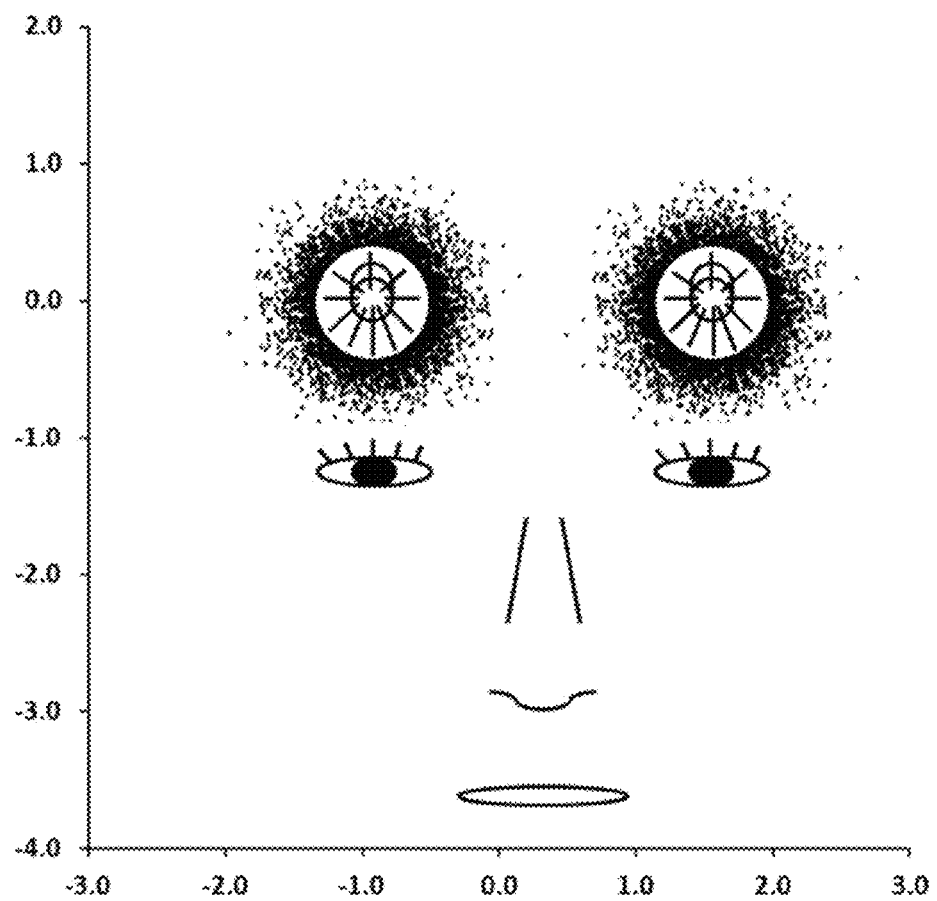
FIG. 11 shows Monte Carlo simulation results for the angular distribution of retro-reflected light from two projectors sources for a representative retroreflective screen with a reduced spread for retro-reflected light. Also in the figure is an overlay of eye positions for a representative viewer at a ~1.5× shorter distance from the screen than in FIG. 10.

FIG. 11 highlights why tightening the angular distribution of retro-reflected light from a retroreflective screen may not necessarily reduce cross-talk significantly. FIG. 11 shows Monte Carlo simulation results for the angular distribution of retro-reflected light from two projectors sources for a representative retroreflective screen with an overlay of facial positions for a representative viewer at a ~1.5× shorter distance to the screen as in FIG. 10. While cross-talk from each projector the opposite eye is reduced, the intensity of light reaching the eye closest to each projector is also significantly reduced as the viewer to screen distance is reduced, so this also does not inherently solve the perceived cross-talk challenge.

Retro-reflective screen elements and angular distribution of light from the elements may be as described, for example, in U.S. Pat. Nos. 3,817,596, 4,775,219 and 7,370,981, and P. R. Yoder, "Study of Light Deviation Errors in Triple Mirrors and Tetrahedral Prisms," J. Optical Soc. Amer., vol. 48, No. 7, pp 496-499 (July 1958), each of which is entirely incorporated herein by reference.

Figure 12:
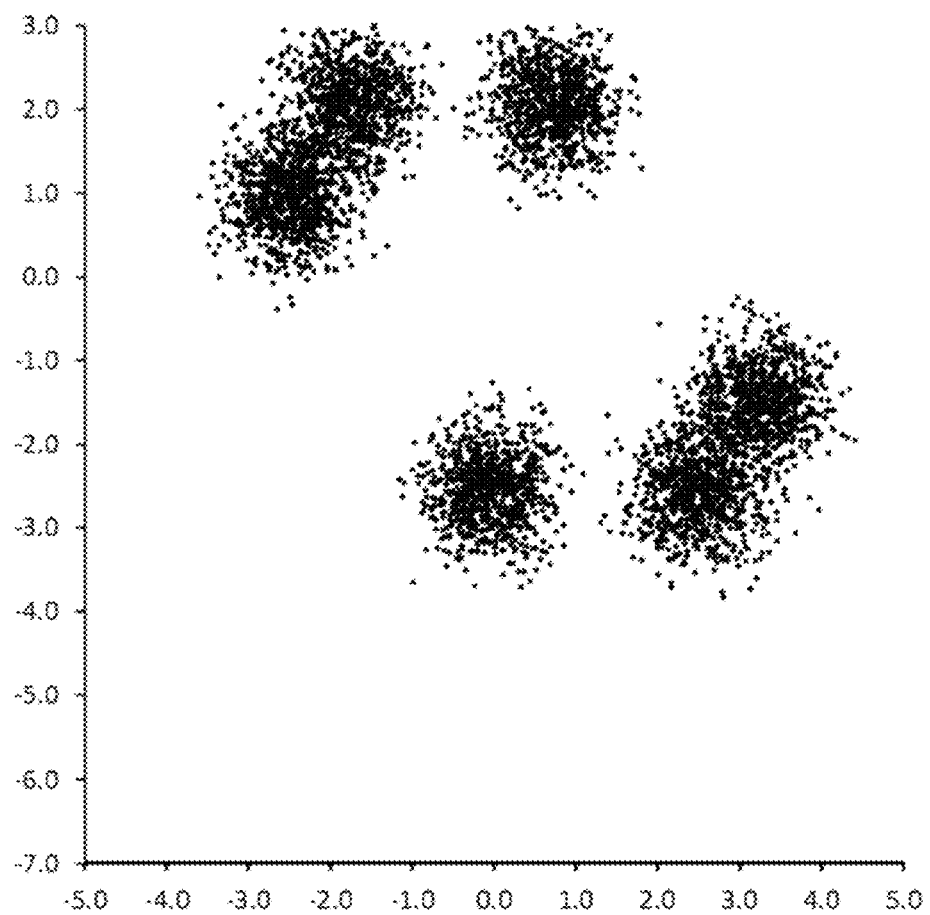
FIG. 12 schematically shows a representative retro-reflected distribution profile that can occur when attempting to engineer a non-zero return angle when the corner cube mirror elements are not engineered to optimize all 6 potential reflection combinations.

FIG. 12 schematically shows what can occur when attempting to engineer a non-zero desired return angle when the corner cube mirror elements are not engineered to optimize all 6 potential reflection combinations. In this case, while one of the 6 possible combinations of reflection sequences has been optimized for hypothetical return angles of roughly 0 degrees in the x-direction and roughly—2.5 degrees in the y-direction—the other 5 reflection sequences result in return angles that differ from this hypothetical desired return angle. Even though the faces of the corner cube element in this case and in the following cases are not perfectly perpendicular, these elements are still regarded as corner-cube retro-reflective screen elements because of the close similarity in form and function to an ideal corner-cube element.

Figure 13:
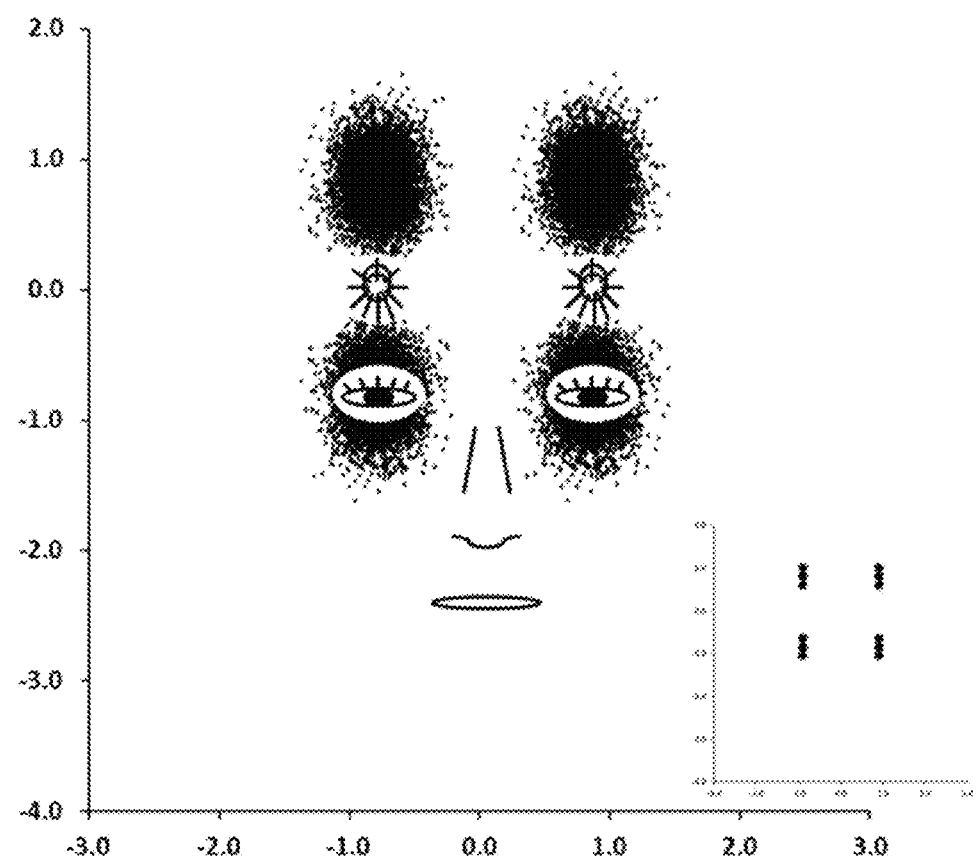
FIG. 13 shows Monte Carlo simulation results for the angular distribution of retro-reflected light from two projectors sources for a representative retroreflective screen engineered to have multiple focal points for returned light that are offset toward the positive and negative vertical directions. Also in the figure is an overlay of eye positions for a representative viewer at a representative distance of 2 meters from the screen.
Figure 21:
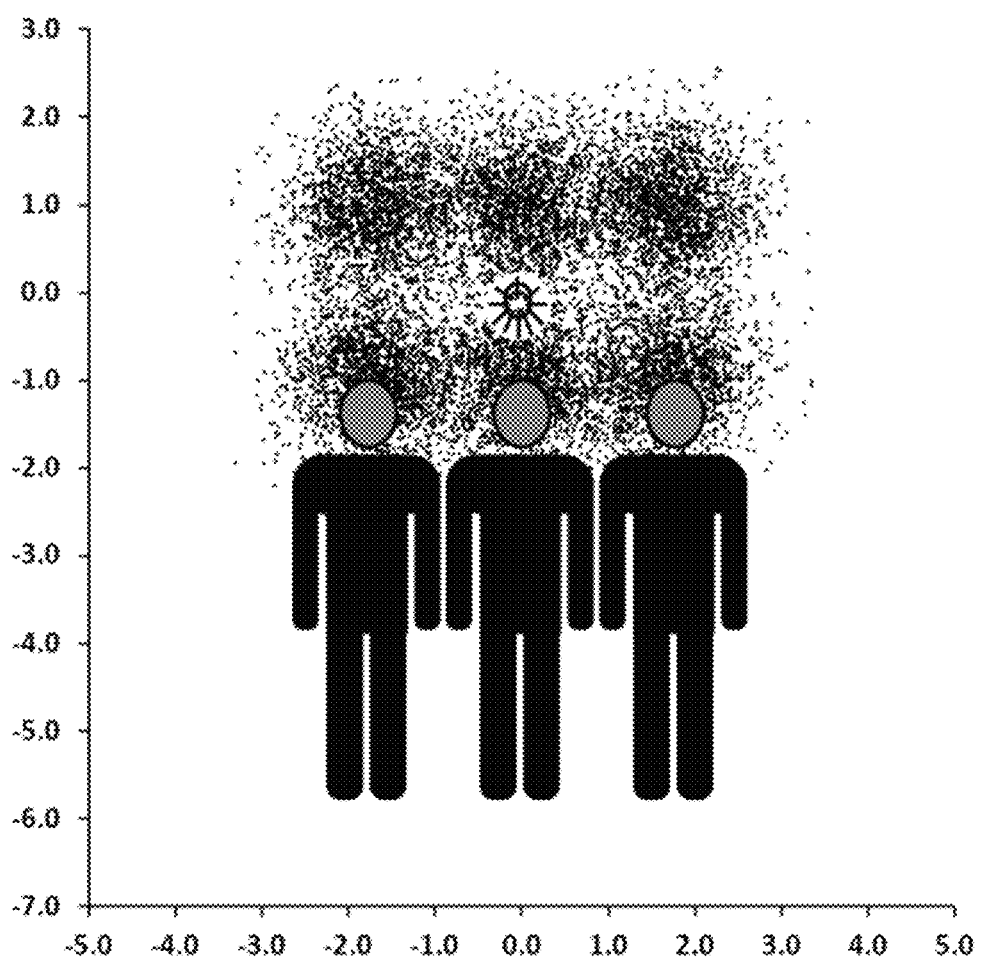
FIG. 21 shows Monte Carlo simulation results for the angular distribution of retro-reflected light from a single projector sources for a representative retroreflective screen engineered to have multiple retro-reflected angles such that the returned light occupies a horizontal band of light with a characteristic width and height corresponding to the desired angles for the specific application. An overlay of multiple views is shown in this chart.
Figure 24:
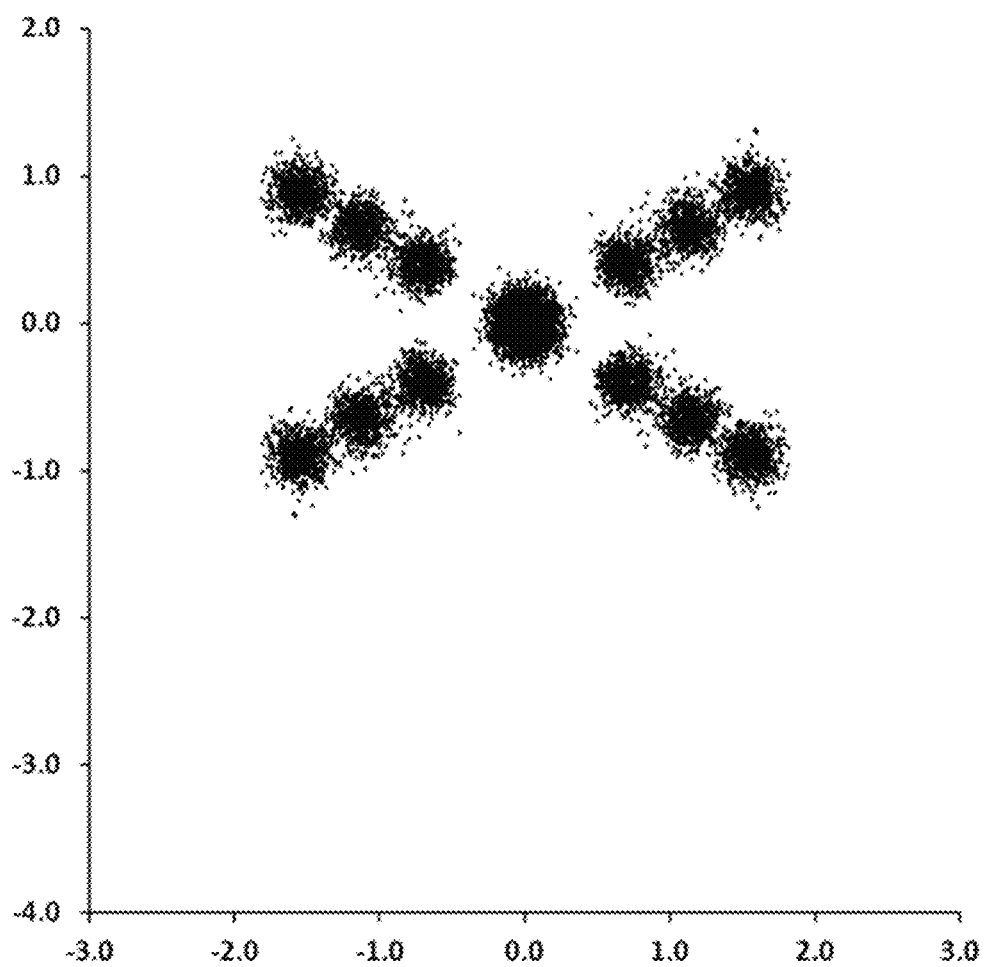
FIG. 24 shows Monte Carlo simulation results for the angular distribution of retro-reflected light from a representative single projector for a representative retroreflective screen that has been formed as described herein, such that the retro-reflected light has a profile angled down and away from the projector. In this simulation, the variation has been reduced in order to better visualize the 13 individual retro-reflected focal regions.

In order to attain an optimal light profile to be optimal for retro-reflective display applications, the present disclosure provides for engineering and customizing retro reflective screen elements of retro reflective screen such that multiple return angles are achieved and combined in order to meet the desired properties for each specific display application. Table 1 shows representative examples of corner cube element configurations. In this table, five representative configurations are provided with the corner cube element configuration described by the amount of deviation (or offset) from the nominal case of 90 degrees for each of the three intersection angles comprising a corner cube element. Configuration i) as starting a baseline configuration includes only a signal corner cube element with all 3 intersection angles at exactly the nominal 90 degrees as indicated by the value '0' shown for each of the delta values. In this case, the return light from the retro-reflective screen is centered on the light source or projector. Configuration ii) in Table 1 shows the case wherein there is a slight reduction in the one of the 3 intersection angles. In this case, the return light may be split and centered above and below the projecting light source. This may be representative of a very basic embodiment of the present disclosure. Configuration iii) in Table 1 shows a representative setup wherein 3 different corner cube element configurations are used in the array of corner cube elements comprising a retro-reflective screen. In this case the resulting light pattern may be split above and below the projecting light source with the multiple elements engineered to enable vertical spread in distribution. An example of this type of configuration is shown in FIG. 13, which is described in more detail below. Configuration iv) shows a representative setup wherein the resulting light pattern is vertically offset and horizontally spread, which may be suited for large area retro-reflective display applications to enable intensity increase and an increased viewing angle. An example of this type of configuration is shown in FIG. 21, as described elsewhere herein. Configuration v) shows a representative setup wherein the resulting light pattern is intentionally engineered into an "X" shaped light pattern. This pattern can be particularly well suited to enabling significant intensity increase for a single project head mounted system. An example of this type of configuration is shown in FIG. 24, as described elsewhere herein. In these examples, image properties such as brightness and 3D cross-talk for projected images, can be significantly improved above and beyond the baseline performance for a retro-reflective display system (Configuration i, "Baseline", in Table 1) that is not formed as described herein. Configurations ii-v provided examples of approaches for engineering retro-reflective screen elements for improved properties (e.g., decreased cross-talk, increased intensity) relative the Baseline configuration.

TABLE 1

| Configuration | Element | Delta from 90 degrees (deg) | | | Description |
| --- | --- | --- | --- | --- | --- |
| | | Angle 1 | Angle 2 | Angle 3 | |
| i) Baseline | A | 0 | 0 | 0 | Light centered on source |
| ii) Directly below eye | A | 0 | 0 | −0.5 | Light above/below source |

TABLE 1-continued

| Configuration | Element | Delta from 90 degrees (deg) | | | Description |
| --- | --- | --- | --- | --- | --- |
| | | Angle 1 | Angle 2 | Angle 3 | |
| iii) Directly below eye (with spread) | A | 0 | 0 | −1.45 | Light pattern above/below source with multiple elements engineered to enable vertical spread in distribution (e.g. FIG. 13) |
| | B | 0 | 0 | −1 | |
| | C | 0 | 0 | −0.55 | |
| iv) For large area screen | A | 0 | 0 | −0.6 | Light pattern above/below source with multiple elements engineered to enable horizontal spread in distribution (e.g. FIG. 21) |
| | B | 0 | 1.2 | 0 | |
| | C | 1.2 | 0 | 0 | |
| v) Single source 2 eyes | A | −0.4 | −0.4 | 0.4 | "X" shaped light pattern (e.g. FIG. 24) |
| | B | −0.25 | −0.25 | 0.25 | |
| | C | −0.55 | −0.55 | 0.55 | |

FIG. 13 shows Monte Carlo simulation results for the angular distribution of retro-reflected light from two projectors sources for a representative retroreflective screen engineered to have multiple focal points for returned light that are offset toward the positive and negative vertical directions. In addition, for this simulation the individual elements in the retroreflective screen have been engineered such that one third (⅓) of the elements have return angle focal points offset in the vertical direction by different amounts. In the inset chart, the variation used in the simulation has been artificially tightened to enable better visualization of the three focal points in the positive y-direction and the three focal points in the negative y-direction for each projector. The graph with the overlay of the viewer using a more typical variation of parameters shows the desired overall light distribution properties. Here, the vertical spread in the cloud of points is larger than the horizontal spread which is desired in order to maximize image intensity as well as to minimize undesired cross-talk between the two projectors. In comparison to FIG. 7, the cross-talk from each projector to the opposite eye has been significantly reduced, as exhibited by the slight gap between the left and right cloud of dots in FIG. 13, whereas in FIG. 7 the left and right cloud of dots have significant overlap. Additionally, the intensity of light reaching the nearest eye from each projector has been increased in FIG. 13 versus FIG. 7. This is exhibited by each eye in FIG. 15 being located within a dense portion of the cloud of dots where for FIG. 7, each eye is approaching the edge of the respective cloud of dots indicating a fall off for intensity. The net result of this is that the ratio of the light intensity from the closer projector to the light from intensity from the farther projector is significantly increased, thereby significantly reducing the perceived cross-talk and improving the overall 3D immersive viewing experience.

Figure 14:
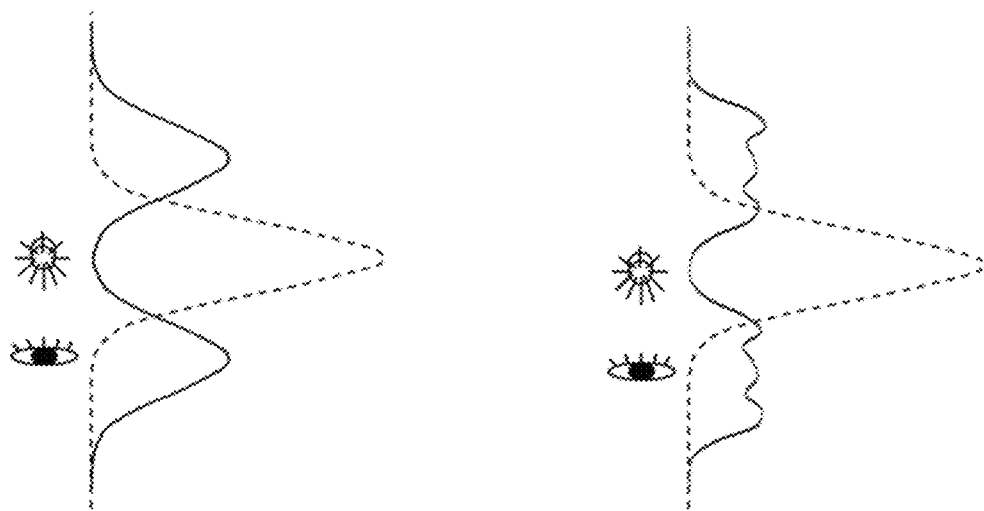
FIG. 14 illustrates the relative intensity profile for a representative retroreflective screen in comparison to the relative intensity profile for a retroreflective screen engineered as described herein (solid lines), for two cases: i) Left portion of diagram shows an embodiment using only a single pair of vertically offset focal points and ii) Right portion of diagram shows an embodiment using only a 3 pairs of vertically offset focal points.

FIG. 14 illustrates the relative intensity profile for a representative retro-reflective screen in the absence of retro-reflective screens of the present disclosure (dotted lines) in comparison to the relative intensity profile for a retro-reflective screen of the present disclosure (solid lines) for two cases: i) Left plot shows an embodiment using only a single pair of vertically offset focal points and ii) Right shows an embodiment using only a 3 pairs of vertically offset focal points. In both figures a representative projector and eye location are superimposed onto the diagram. In both the left and right figure, the intensity profile for a representative retroreflective screen that has not been formed as described herein (dotted lines) drops off substantially rapidly away from the immediate proximity of the projector and is a small fraction of the peak intensity at the location of the viewer's eye. In contrast, the solid line in the left plot has its peak intensity reduced by about a factor of 2 due to splitting of the light profile into two peaks, however the location of the peak is in close proximity to the location of the eye. The end result is that the intensity of light as observed by the viewer may be significantly increased when using an engineered retro-reflective screen of the present disclosure. In the right plot, the intensity profile more closely matches the scenario shown in FIG. 13 in which three pairs of vertically offset focal points are chosen such that the light is spread vertically but remains in close proximity to the viewer's eye. In this case, further reduction in peak intensity is observed, however the range of optimized viewing angles has been significantly increased.

Figure 15:
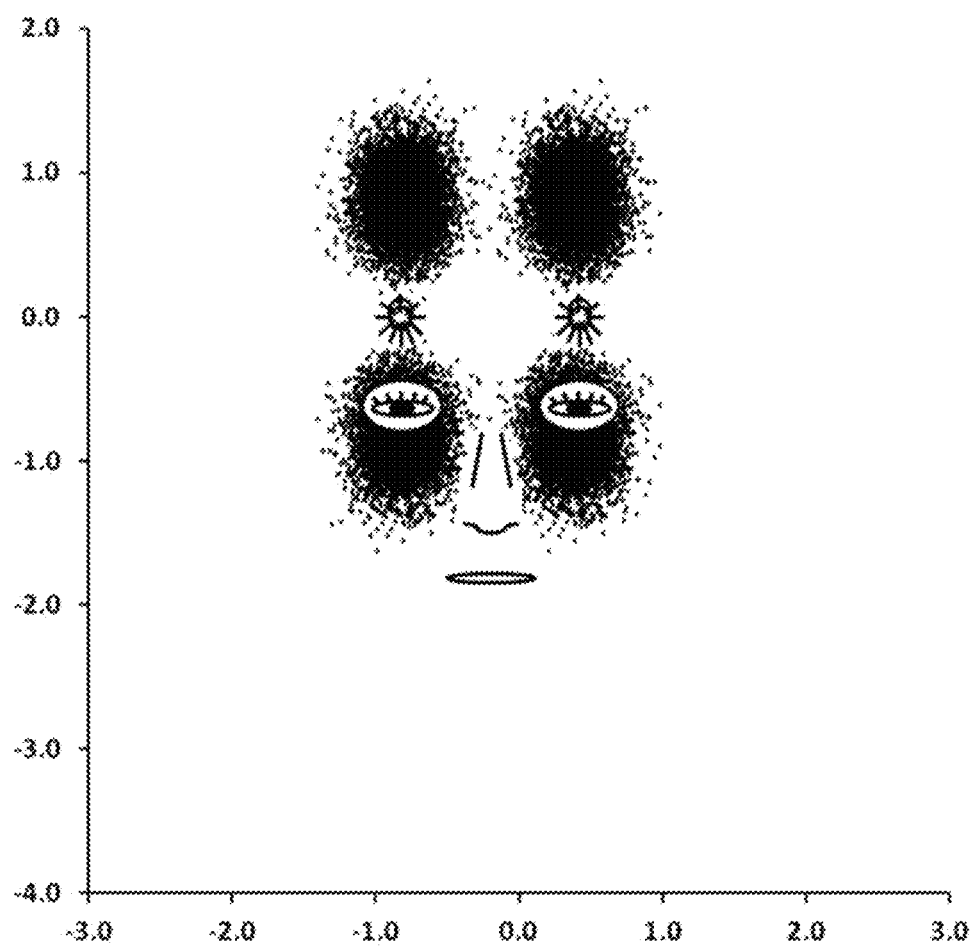
FIG. 15 shows Monte Carlo simulation results for the angular distribution of retro-reflected light from two projectors sources for a representative retroreflective screen engineered to have multiple focal points for returned light that are offset toward the positive and negative vertical directions. Also in the figure is an overlay of eye positions for a representative viewer at a 1.5× longer distance from the screen than for the scenario in FIG. 14.

FIG. 15 shows Monte Carlo simulation results for the angular distribution of retro-reflected light from two projectors sources for a representative retroreflective screen engineered to have a larger vertical spread of returned light that is also offset toward the negative vertical direction. Also in the figure is an overlay of eye positions for a representative viewer at a ~1.5× shorter distance from the screen than for the scenario in FIG. 14. A difference with respect to FIG. 13 is that with the larger distance between the viewer and screen, the angle between projectors and facial features is reduced, while the angular distribution of retro-reflected light remains unchanged for each projector. In this scenario, the amount of cross-talk increases relative to the scenario depicted in FIG. 13 however the amount of cross-talk is significantly decreased as compared to the equivalent scenario shown in FIG. 8, in which the retro-reflective screen is not formed as described herein.

Figure 16:
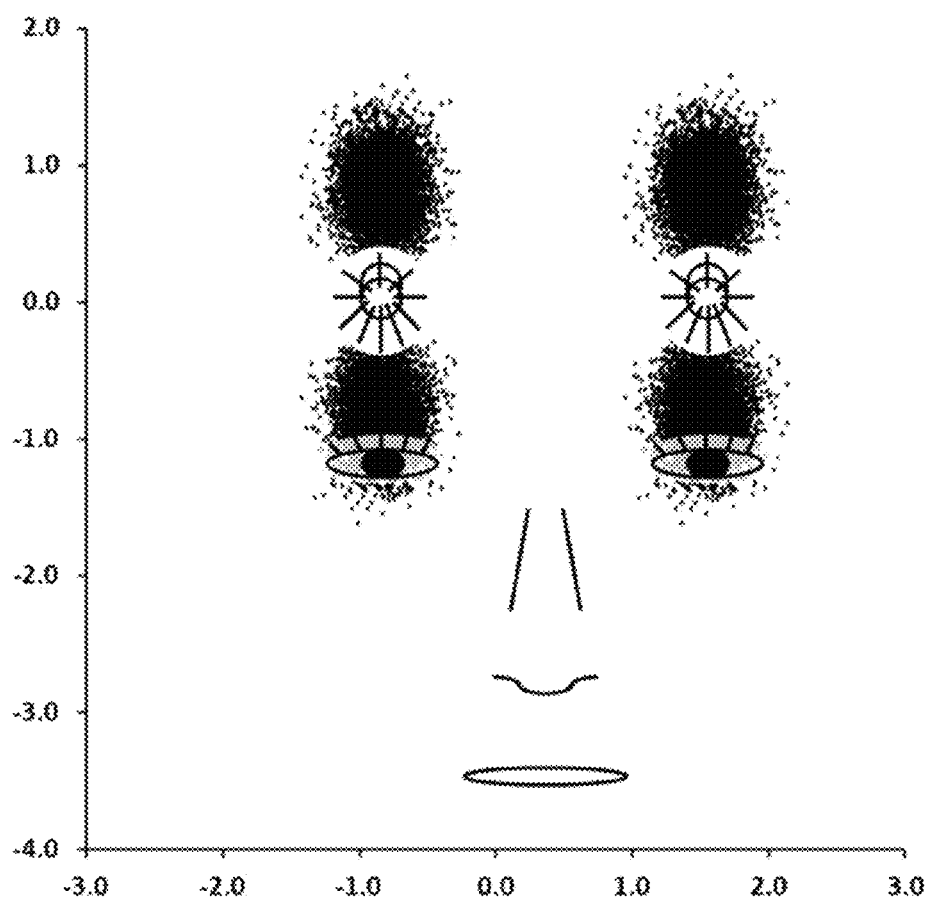
FIG. 16 shows Monte Carlo simulation results for the angular distribution of retro-reflected light from two projectors sources for a representative retroreflective screen engineered to have multiple focal points for returned light that are offset toward the positive and negative vertical directions. Also in the figure is an overlay of eye positions for a representative viewer at a 1.5× shorter distance from the screen than for the scenario in FIG. 14.

FIG. 16 shows Monte Carlo simulation results for the angular distribution of retro-reflected light from two projectors sources for a representative retroreflective screen engineered to have a larger vertical spread of returned light that is also offset toward the negative vertical direction. Also in the figure is an overlay of eye positions for a representative viewer at a ~1.5× smaller distance from the screen than for the scenario in FIG. 13. A difference between this figure and FIG. 13 is that with the smaller distance between the viewer and screen the angle between projectors and facial features is reduced, while the angular distribution of retro-reflected light remains unchanged for each projector. In this scenario, cross-talk may be significantly reduced. An additional benefit for this scenario is that the offset return angle to target a negative angle in the y-axis direction is that the intensity of light reaching each eye from the closest projector is much higher than for the baseline scenario shown in FIG. 9 for a retro-reflective screen that has not been formed as described herein.

FIGS. 13-16 describe approaches for improving a 2-projector glasses free 3D retro-reflective display system. Another area of application is a large area, long distance retro-reflective display system in which distances from the viewer to the screen are larger, such as, for example, at least about 5 meters, 10 meters, or 20 meters. In this type of large size and long range display system, there may be the desire for multiple viewers to be able to view the retro-reflected image or video.

Figure 17:
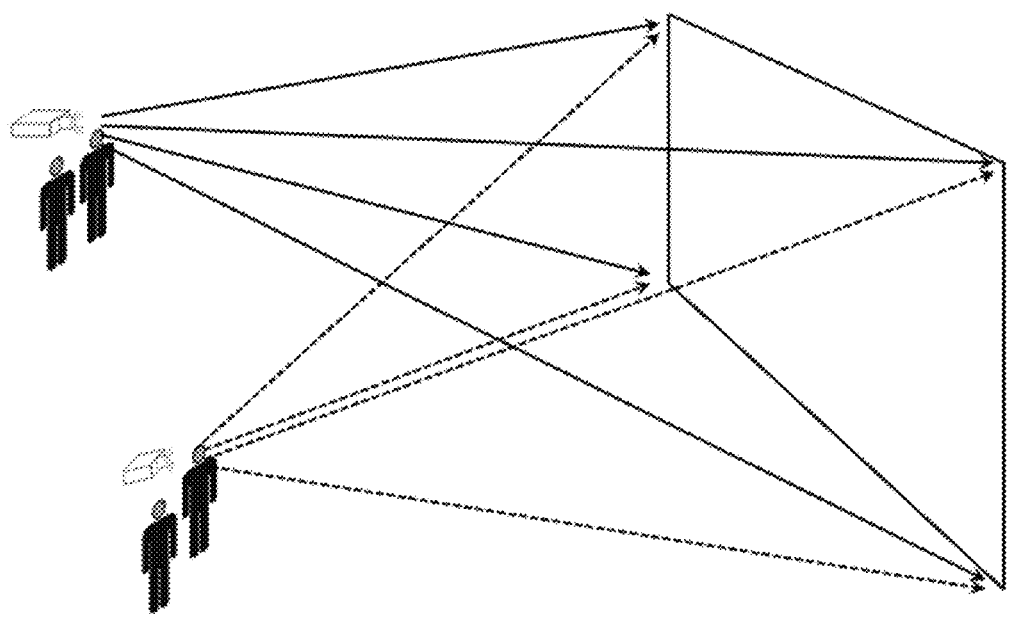
FIG. 17 schematically illustrates a retro-reflective display application in which viewers are at a significant distance (>>200 cm) from the screen and a projector may be in proximity to each of the viewers, but not head-mounted, resulting in a projector to eye distance greater than that shown in FIGS. 6-17.

Another aspect provides a retro-reflective display system that enables multiple viewers to be able to view a reflected image or video. FIG. 17 schematically illustrates a retro-reflective display application in which each viewer is at a significant distance (>>2 meters) from the screen and where the projector may be in proximity to the viewer, but potentially not head-mounted to the viewer resulting in a projector to eye distance of >>5 cm. Examples of this application may be in a mall, museum, amusement park, airport or outdoor setting wherein it may be desired to have multiple projectors positioned around a retro-reflective screen in order to display many different image or video feeds on to the same screen area simultaneously at a very high brightness or intensity. This is schematically represented in the Figure by two sets of viewers at different locations with the solid lines representing the projected image from one projector while the dashed lines represent the projected image from the second projector landing on the same area of the large screen. A challenge with this type of setup is enabling more than one viewer to see the image from each projector. Increasing the angular spread from the retro-reflective screen may result in too much intensity loss, while keeping a tight angular spread may limit viewers to about 1 per projector, as illustrated below. Methods and systems of the present disclosure may overcome such a challenge.

Figure 18:
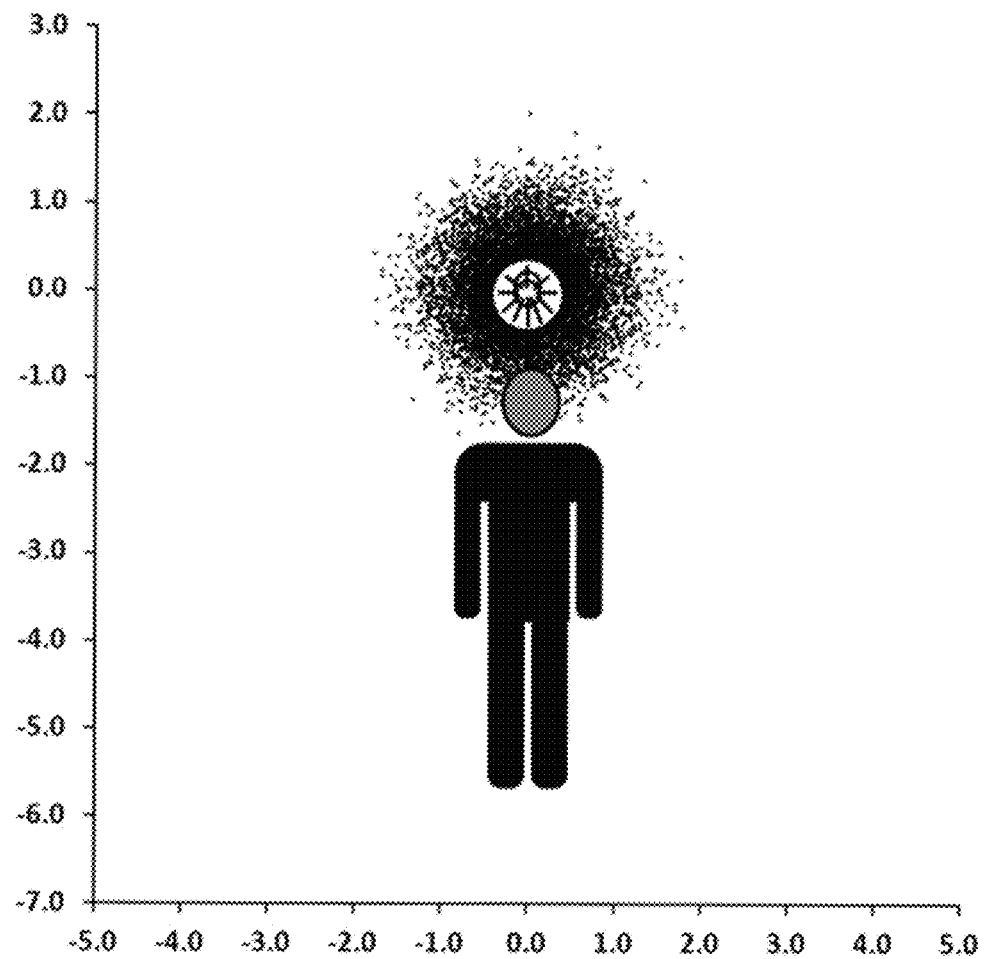
FIG. 18 shows Monte Carlo simulation results for the angular distribution of retro-reflected light from a single projector sources for a representative retroreflective screen with an overlay of a representative viewer at a nominal distance of 20 meters from the screen.

FIG. 18 shows Monte Carlo simulation results for the angular distribution of retro-reflected light from a single projector sources for a representative retroreflective screen with an overlay of a representative viewer at a distance of 20 meters from the screen. In this figure, retro-reflective screen elements have not been engineered by the approaches described herein. One viewer directly below the project may view the image, but that the retro-reflected image may not be as bright (or intense) as may be ideal given that the viewer's head is already in a region showing few retro-reflected dots.

Figure 19:
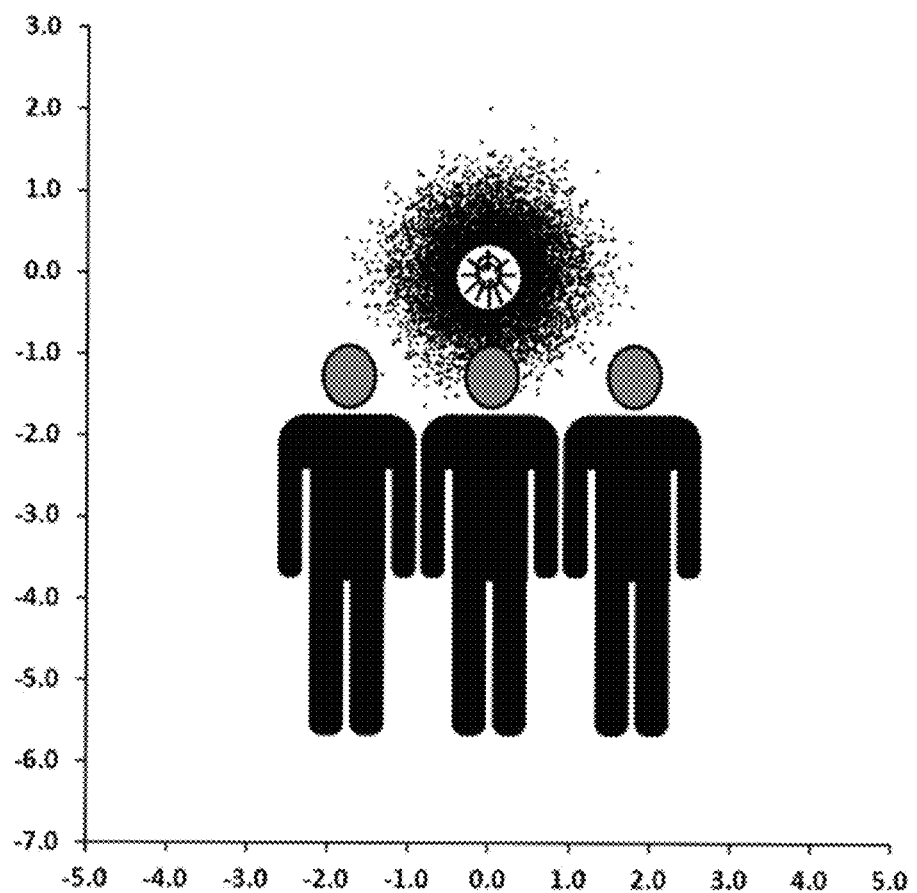
FIG. 19 shows Monte Carlo simulation results for the angular distribution of retro-reflected light from a single projector sources for a representative retroreflective screen with an overlay of several viewers at a nominal distance of 20 meters from the screen.

FIG. 19 shows Monte Carlo simulation results for the angular distribution of retro-reflected light from a single projector sources for a representative retroreflective screen with an overlay of several viewers at a distance of 20 meters from the screen. This figure shows that it may be challenging for multiple viewers to observe the same image or video, or observe the same image or video at the same viewing experience (e.g., intensity), from a single projector since some of the viewers may be completely outside of the typical cone of retro-reflected light. In the figure, the middle viewer is within the cone of reflected light but the two outside viewers are nearly outside the cone of reflected light.

Figure 20:
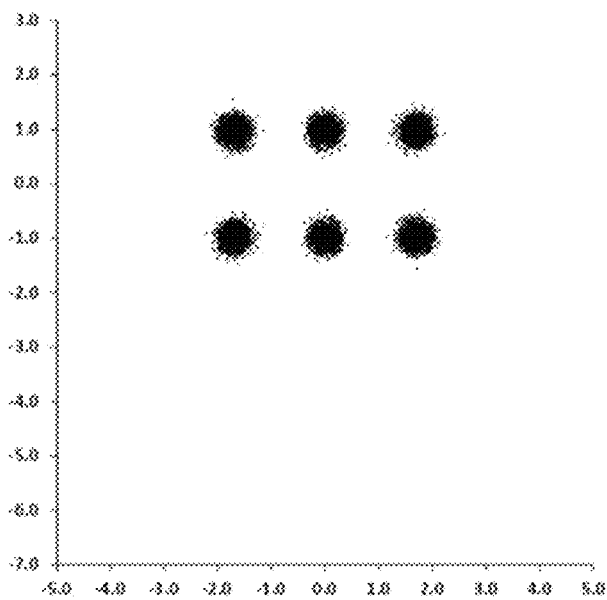
FIG. 20 shows two examples of Monte Carlo simulation results for the angular distribution of retro-reflected light from a single projector sources for a representative retroreflective screen engineered to have multiple retro-reflected angles such that the returned light occupies a horizontal band of light. In this figure the variation parameter has been tightened to enable better visualization of the individual return angle center points.
Figure 20:
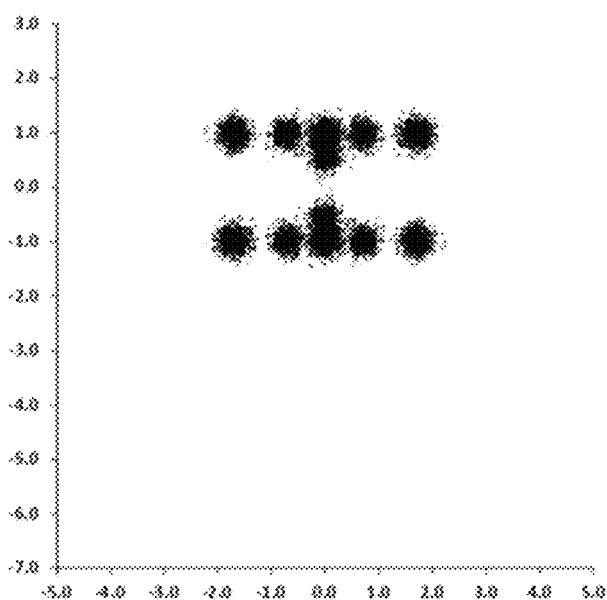

FIG. 20 shows Monte Carlo simulation results for the angular distribution of retro-reflected light from a single projector sources for a representative retroreflective screen engineered to have multiple retro-reflected angles such that the returned light occupies a horizontal band of light with a characteristic width and height corresponding to the desired angles for the specific application. In this specific figure, two examples are shown. In representative scenario shown by the top graph, six specific return angles are targeted to spread from approximately −2 degrees to +2 degrees in the x-direction and approximately −1 degree to +1 degree in the y direction. The uniformity of the retro-reflected distribution has been tightened in this Monte Carlo simulation in order to better show the 6 individually targeted return angles. In the scenario shown by the bottom graph, 6 specific return angles are targeted to spread from approximately −2 degrees to +2 degrees in the x-direction and approximately −1 degrees to +1 degrees in the y direction. With a viewer's head centered at y=−1 degrees, for the top graph there are 3 regions of high intensity at the viewer's head level, while for the bottom graph there are 5 regions of high intensity at the viewer's head level. The uniformity of the retro-reflected distribution has been tightened in this Monte Carlo simulation in order to better show the individually targeted return angles. The choice of number of targeted return angles can be customized depending on the desired properties such as spread and uniformity for the retro-reflected light. Additionally, each of the targeted return angles may be due to retro-reflection from a specific corner cube mirror configuration that is then repeated throughout the extent of the retro-reflective screen. It is desirable that the number of mirror configurations, denoted here-in as "N", be small enough such that N corner cubes may fit into an area of the screen which is equal to or smaller than a single pixel for the projected image. For example, if a screen is 10 meters wide by 5 meters tall with a desired image resolution of 2000× 1000 pixels, then each pixel may be 5 millimeters (mm)×5 mm when projected on to the screen. If sixteen unique return angle configurations are desired, then each corner cube in the retroreflective screen may be less than 1.25 mm×1.25 mm in size. In actual practice, individual corner cube elements in retroreflective screens are much smaller than this dimension.

FIG. 21 shows Monte Carlo simulation results for the angular distribution of retro-reflected light from a single projector sources for a representative retroreflective screen engineered to have multiple retro-reflected angles such that the returned light occupies a horizontal band of light with a characteristic width and height corresponding to the desired angles for the specific application. An overlay of multiple viewers is shown in this chart. As may be seen in FIG. 21, incorporation of systems of the present disclosure can enable multiple viewers to see the retro-reflective image. By having the center points for the retro-reflected light be targeted to a negative angle in the y-axis direction, the slight loss in intensity due to lateral spread of the light is more than offset by having the vertical placement of the retro-reflected light aligned to the viewers' locations.

Figure 22:
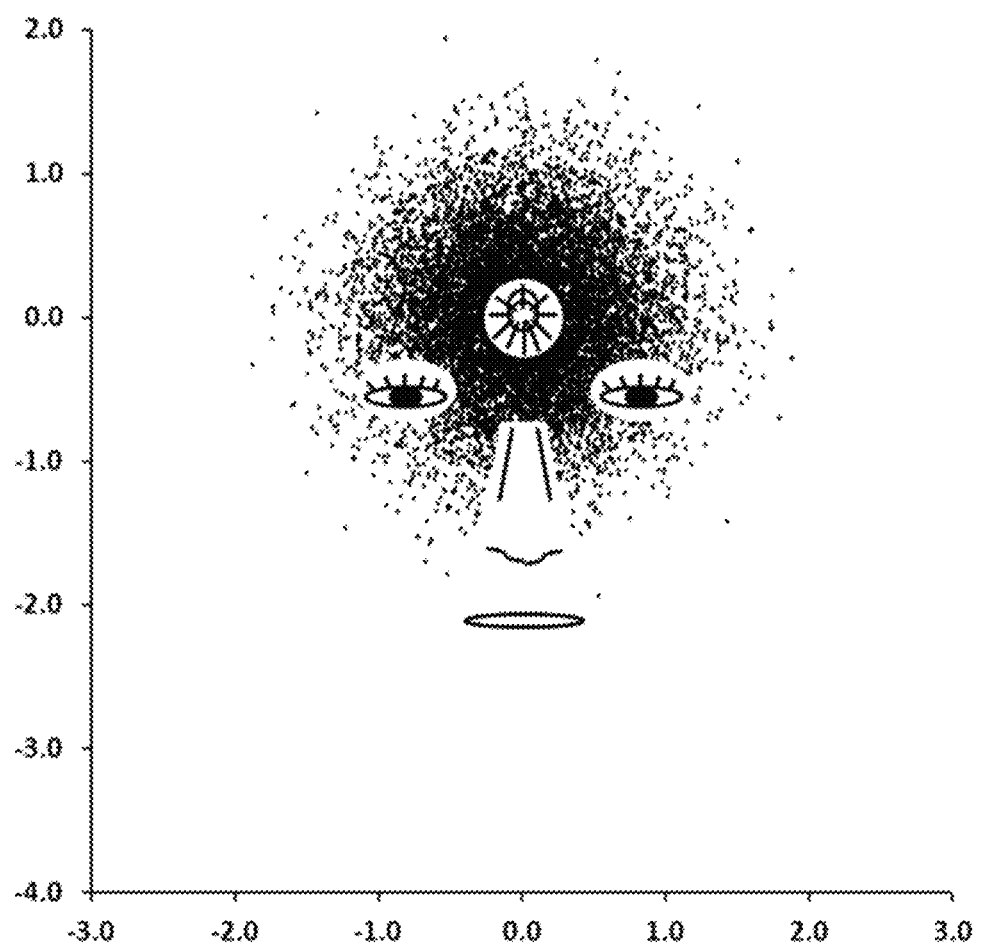
FIG. 22 shows Monte Carlo simulation results for the angular distribution of retro-reflected light from a representative single projector with a center head-mounted geometry for a representative retroreflective screen that has not been engineered as described herein, with an overlay of eye positions for a representative viewer.

Another example is around using a single head-mounted projector to display an image to both eyes in a retroreflective display system. FIG. 22 shows Monte Carlo simulation results for the angular distribution of retro-reflected light from a representative single projector with a center head-mounted geometry for a representative retroreflective screen that has not been formed as described herein, with an overlay of eye positions for a representative viewer. In this case the viewer is at roughly 5 feet from the screen. If the projector is head-mounted between the eyes of the viewer, each eye may receive some of the retro reflected light, but a substantial amount of the light may be reflected towards the top of the head and towards a region between the eyes. This may not be ideal for individuals without eyes in the middle of their foreheads.

Figure 23:
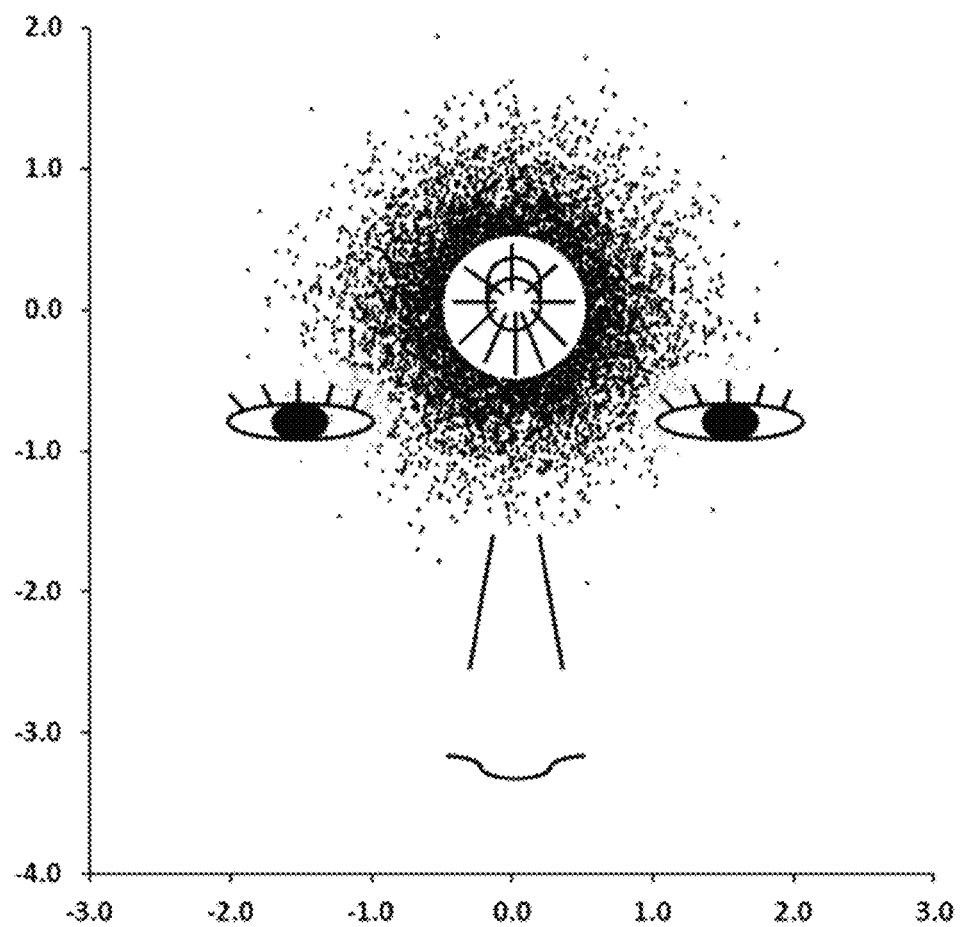
FIG. 23 shows Monte Carlo simulation results for the angular distribution of retro-reflected light from a representative single projector with a center head-mounted geometry for a representative retroreflective screen that has not been engineered as described herein, with an overlay of eye positions for a representative viewer at a ~2× shorter distance from the screen than in FIG. 22.

FIG. 23 shows Monte Carlo simulation results for the angular distribution of retro-reflected light from a representative single projector with a center head-mounted geometry for a representative retroreflective screen that has not been formed as described herein, with an overlay of eye positions for a representative viewer at a ~2× shorter distance from the screen than in FIG. 22. In this case with the screen at roughly 100 centimeters (cm) from the viewer, intensity of light can drop off rapidly as the viewer approaches too close to the retro-reflected screen resulting in significant loss of image brightness. The ability to use a retro-reflective screen at close distances may enable a retro-reflective display system that may replace personal computing monitor systems and/or medium size display setups in which the viewer-to-screen distance may be in the range of roughly 40 cm-120 cm. Having a retro-reflective display system for this type of application has many advantages such as privacy, low power usage and a much larger effective resolution and screen size compared to current state of the art systems. However, as can be seen in FIG. 23, the increase in return angle from the projector to the viewer's eyes at these shorter distances, results in too significant of an intensity drop-off with the result that the required intensity gains from the retro-reflective nature of the display system are lost. A retro-reflective display system formed as described herein can enable significant intensity gain even at a much reduced viewer-to-screen distance.

FIG. 24 shows Monte Carlo simulation results for the angular distribution of retro-reflected light from a representative single projector for a representative retroreflective screen formed as described herein, such that the retro-reflected light has a profile angled down and away from the projector. In this simulation, the variation has been reduced in order to better visualize the several individual retro-reflected focal regions. By preferentially forcing the return angle down and away from the projector location (at the origin) in this manner (as well as the symmetrical focal points up and away from the origin) and by having multiple return angle center points, the goal is to achieve a bright viewing image that retains its intensity independent of the distance of the viewer from the screen.

Figure 25:
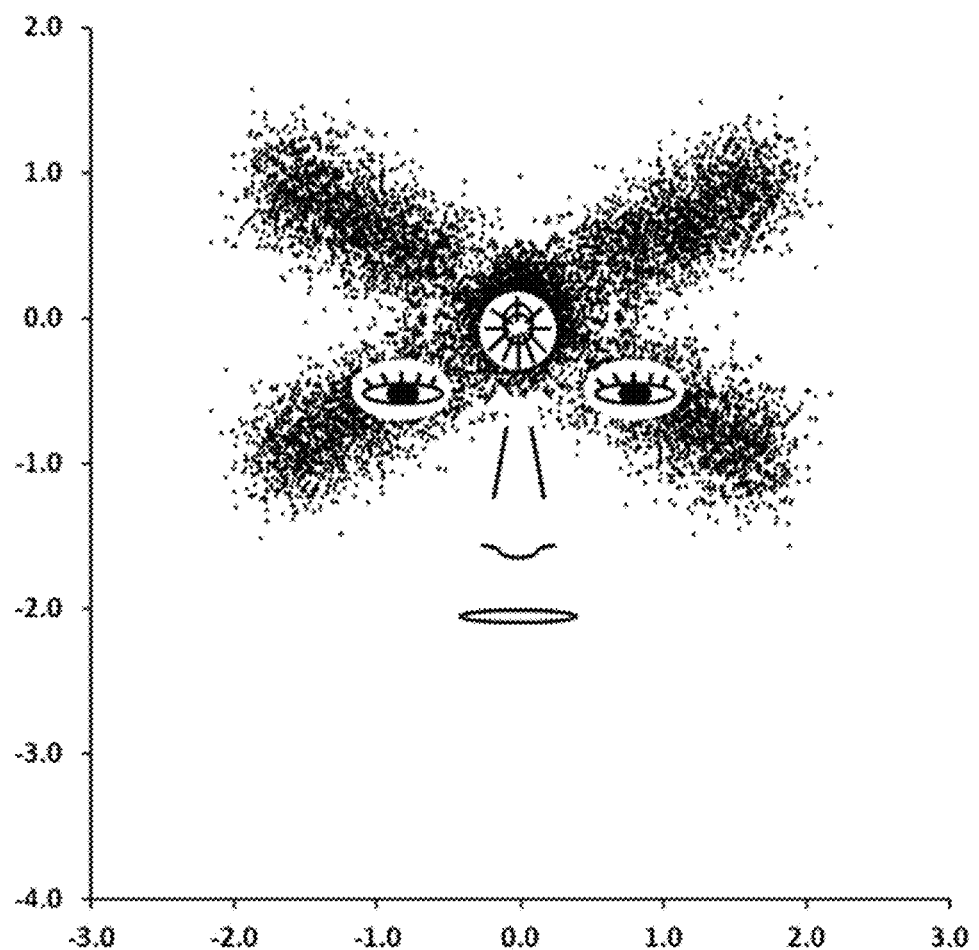
FIG. 25 shows Monte Carlo simulation results for the angular distribution of retro-reflected light from a representative single projector for a representative retroreflective screen that has been formed as described herein, such that the retro-reflected light has a profile angled down and away from the projector. In this simulation, the variation utilized in the simulation is more reflective of what may be targeted for actual applications. Also shown is an overlay of eye positions for a representative viewer at a nominal distance from the screen.

FIG. 25 shows Monte Carlo simulation results for the angular distribution of retro-reflected light from a representative single projector for a representative retroreflective screen formed as described herein, such that the retro-reflected light has a profile angled down and away from the projector similar to the configuration in FIG. 24, but with a more typical variation setting. Also shown is an overlay of eye positions for a representative viewer at a nominal distance from the screen. In contrast to FIG. 22, the angular distribution of light in FIG. 24 has been engineered such that the cloud of points overlays with the location of the two eyes of the viewer.

Figure 26:
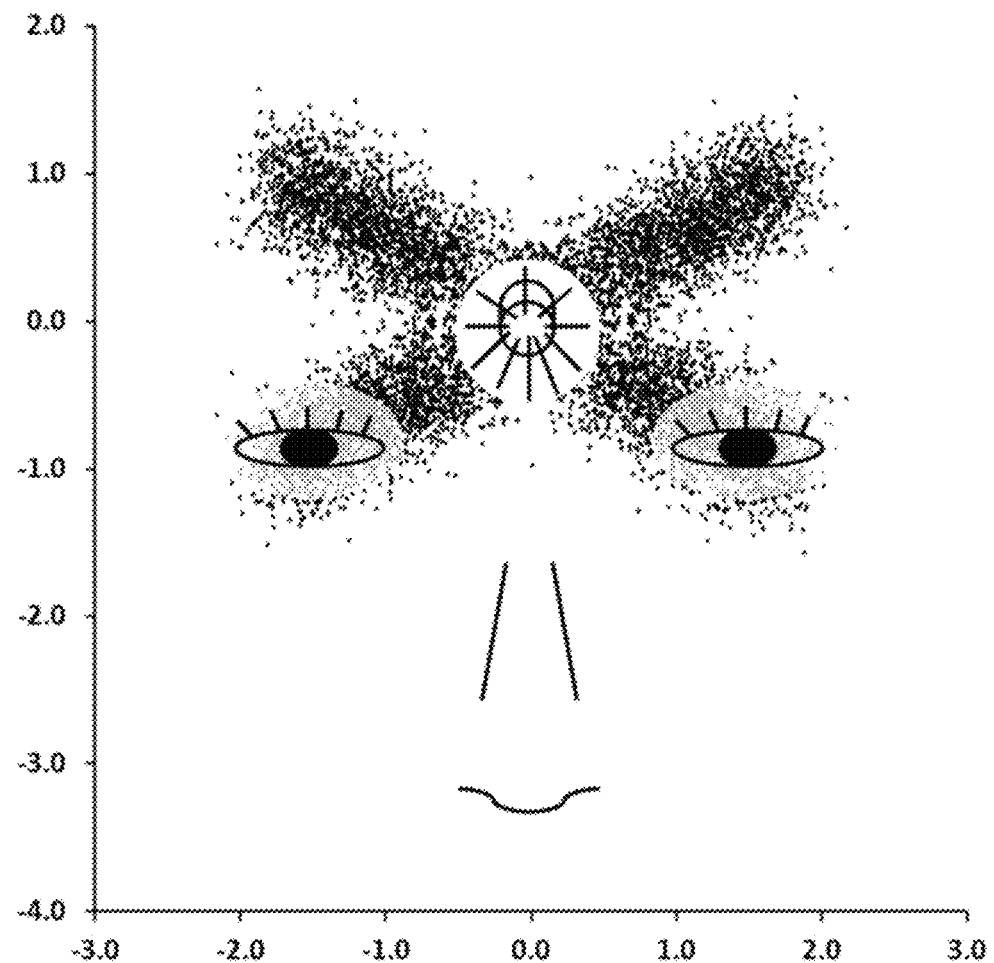
FIG. 26 shows Monte Carlo simulation results for the angular distribution of retro-reflected light from a representative single projector for a representative retroreflective screen that has been formed as described herein, such that the retro-reflected light has a profile angled down and away from the projector. Also shown is an overlay of eye positions for a representative viewer at a ~2× shorter distance from the screen than in FIG. 25.

FIG. 26 shows Monte Carlo simulation results for the angular distribution of retro-reflected light from a representative single projector for a representative retroreflective screen formed as described herein, such that the retro-reflected light has a profile angled down and away from the projector. Also shown is an overlay of eye positions for a representative viewer at ~100 cm from the screen or a ~2× shorter distance from the screen than in FIG. 25. Upon comparison to FIG. 23, it may be observed that a significant increase in light intensity can be obtained using retro-reflective screens formed as described herein, as exhibited by the density of dots in close proximity to each eye.

There are various approaches for manufacturing retro-reflective screens with retro-reflective screen elements. Examples of such approaches are described in U.S. Pat. Nos. 5,763,049 and 7,261,424, each of which is entirely incorporated herein by reference.

Computer Systems

Another aspect of the present disclosure provides a system that is programmed or otherwise configured to implement the methods of the disclosure. The system can include a computer server that is operatively coupled to a projector and a photo detector. The projector and photo detector can be standalone units, or integrated as a projection and detection system.

Figure 27:
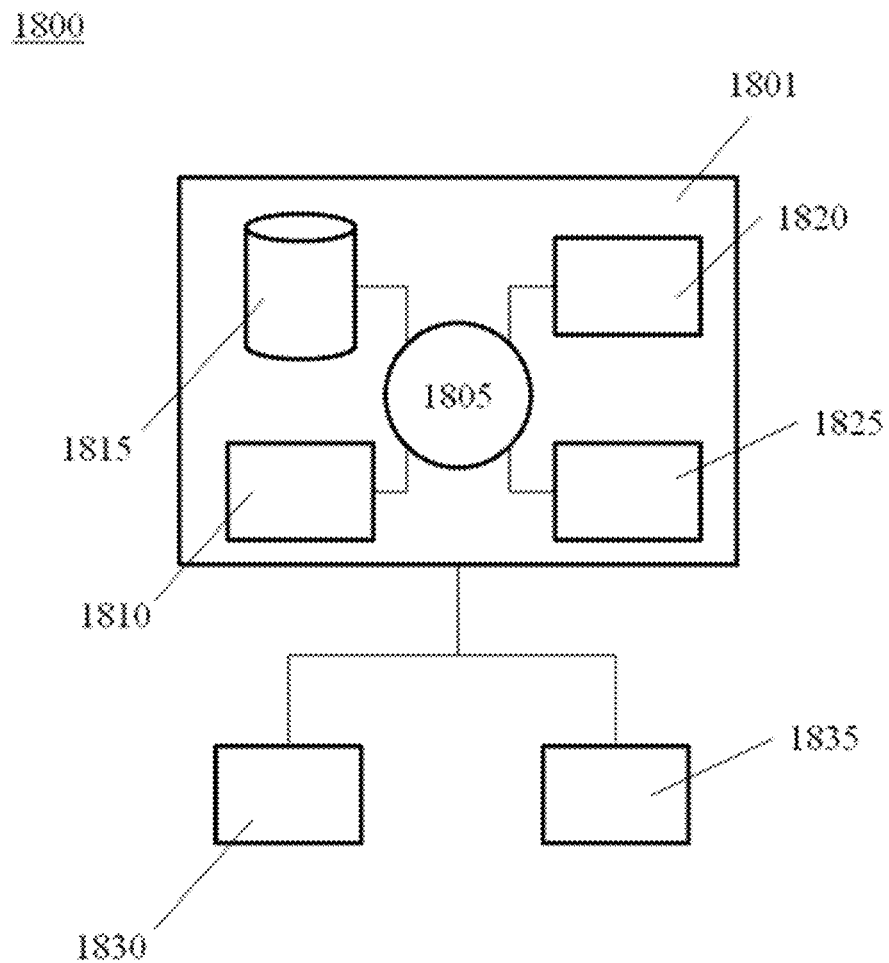
FIG. 27 schematically illustrates a computer system programmed or otherwise configured to facilitate methods of the present disclosure.

FIG. 27 shows a system 1800 comprising a computer server ("server") 1801 that is programmed to implement methods disclosed herein. The server 1801 includes a central processing unit (CPU, also "processor" and "computer processor" herein) 1805, which can be a single core or multi core processor, or a plurality of processors for parallel processing. The server 1801 also includes memory 1810 (e.g., random-access memory, read-only memory, flash memory), electronic storage unit 1815 (e.g., hard disk), communication interface 1820 (e.g., network adapter) for communicating with one or more other systems, and peripheral devices 1825, such as cache, other memory, data storage and/or electronic display adapters. The memory 1810, storage unit 1815, interface 1820 and peripheral devices 1825 are in communication with the CPU 1805 through a communication bus (solid lines), such as a motherboard. The storage unit 1815 can be a data storage unit (or data repository) for storing data. The server 1801 can be operatively coupled to a computer network ("network") with the aid of the communication interface 1820. The network can be the Internet, an internet and/or extranet, or an intranet and/or extranet that is in communication with the Internet. The network in some cases is a telecommunication and/or data network. The network can include one or more computer servers, which can enable distributed computing, such as cloud computing. The network, in some cases with the aid of the server 1801, can implement a peer-to-peer network, which may enable devices coupled to the server 1801 to behave as a client or a server.

The storage unit 1815 can store files or data. The server 1801 can include one or more additional data storage units that are external to the server 1801, such as located on a remote server that is in communication with the server 1801 through an intranet or the Internet.

In some situations, the system 1800 includes a single server 1801. In other situations, the system 1800 includes multiple servers in communication with one another through an intranet and/or the Internet.

The server 1801 can be adapted to store user information and data of or related to a projection environment, such as, for example, display angles and intensity settings. The server 1801 can be programmed to display an image or video through a projector coupled to the server 1801.

Methods as described herein can be implemented by way of machine (or computer processor) executable code (or software) stored on an electronic storage location of the server 1801, such as, for example, on the memory 1810 or electronic storage unit 1815. During use, the code can be executed by the processor 1805. In some cases, the code can be retrieved from the storage unit 1815 and stored on the memory 1810 for ready access by the processor 1805. In some situations, the electronic storage unit 1815 can be precluded, and machine-executable instructions are stored on memory 1810.

The code can be pre-compiled and configured for use with a machine have a processor adapted to execute the code, or can be compiled during runtime. The code can be supplied in a programming language that can be selected to enable the code to execute in a pre-compiled or as-compiled fashion.

The server 1801 is coupled to (e.g., in communication with) a projector 1830 and a photo detector 1835. In an example, the projector 1830 can project an image or video onto a retro-reflective screen. In another example, the project 1830 can project ultraviolet or infrared light onto the retro-reflective screen. The photo detector 1835 can detect (or measure) reflected light from the retro-reflective screen.

The projector 1830 can include one or more optics for directing and/or focusing an image or video onto the retro-reflective screen. The photo detector can be a device that is configured to generate an electrical current upon exposure to light, such as, for example, a charge-coupled device (CCD).

Aspects of the systems and methods provided herein, such as the server 1801, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables, copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

Methods and systems of the present disclosure can be implemented by way of one or more algorithms. An algorithm can be implemented by way of software upon execution by the central processing unit 1805. The algorithm can, for example, determine optimum offsets for retro-reflective screen elements.

Systems and methods provided herein may be combined with or modified by other systems and methods, such as those described in, for example, U.S. Patent Publication No. 2013/0342813; U.S. Pat. Nos. 3,817,596, 4,775,219, 5,763,049, 7,261,424, and 7,370,981; and P. R. Yoder, "Study of Light Deviation Errors in Triple Mirrors and Tetrahedral Prisms," J. Optical Soc. Amer., vol. 48, No. 7, pp 496-499 (July 1958), each of which is entirely incorporated herein by reference, each of which is entirely incorporated herein by reference.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A display system, comprising:
   a retro-reflective screen having retro-reflective screen elements that reflect incident light, wherein each of the retro-reflective screen elements comprises three intersecting planes, wherein at least one of the three intersecting planes intersects an adjacent plane at an angle that is 90° with an offset greater than 0°; and
   at least one projector that (i) generates light characterizing an image or video and (ii) projects the light onto the retro-reflective screen,
   wherein the retro-reflective screen having the retro-reflective screen elements reflects the light at an optical cross-talk that is decreased by at least 10% and/or an intensity that is increased by a factor of at least 1.1, as compared to a retro-reflective screen with retro-reflective screen elements having planes that each intersects an adjacent plane at an angle of 90° without the offset.

2. The display system of claim 1, wherein each of at least two of the three intersecting planes intersects an adjacent plane at an angle that is 90° with an offset greater than 0°.

3. The display system of claim 1, wherein each of the three intersecting planes intersects an adjacent plane at an angle that is 90° with an offset greater than 0°.

4. The display system of claim 1, wherein the offset is at least about 0.1°.

5. The display system of claim 4, wherein the offset is at least about 0.3°.

6. The display system of claim 5, wherein the offset is at least about 0.5°.

7. The display system of claim 1, wherein the projector projects the light onto the retro-reflective screen without passage through a beam splitter.

8. The display system of claim 1, wherein the retro-reflective screen reflects the light from the projector to a viewer without the passage of light through a beam splitter.

9. The display system of claim 1, wherein the retro-reflective screen reflects the light from the projector to a viewer at an observation angle that is less than about 3°.

10. The display system of claim 1, wherein the projector is mountable on a body of a viewer.

11. The display system of claim 1, wherein the retro-reflective screen comprises truncated corner cube reflectors.

12. The display system of claim 1, wherein the image or video is three-dimensional.

13. The display system of claim 1, wherein the optical cross-talk is decreased by at least 20%.

14. The display system of claim 1, wherein the factor is at least 1.5.

15. The display system of claim 1, wherein the retro-reflective screen having the retro-reflective screen elements reflects the light at an optical cross-talk that is decreased by at least 10% and an intensity that is increased by a factor of at least 1.1.

16. The display system of claim 1, wherein a first plane of the three intersecting planes intersects an adjacent plane at an angle that is 90° with a first offset greater than 0°, a second plane of the three intersecting planes intersects an adjacent plane at an angle that is 90° with a second offset greater than 0°, wherein the first offset is different from the second offset.

17. The display system of claim 1, wherein the retro-reflective screen elements reflect the light at multiple return angles.

* * * * *